US012743043B2

(12) United States Patent
Mine et al.

(10) Patent No.: US 12,743,043 B2
(45) Date of Patent: Sep. 22, 2026

(54) IMAGE FORMING SYSTEM WITH TONER AND FIXING DEVICE

(71) Applicant: KONICA MINOLTA, INC., Tokyo (JP)

(72) Inventors: Tomoko Mine, Hino (JP); Kazumi Oura, Sagamihara (JP); Yasuko Uchino, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 19/066,248

(22) Filed: Feb. 28, 2025

(65) Prior Publication Data

US 2025/0284233 A1 Sep. 11, 2025

(30) Foreign Application Priority Data

Mar. 11, 2024 (JP) ................................ 2024-037127

(51) Int. Cl.
*G03G 15/20* (2006.01)
*G03G 9/087* (2006.01)
*G03G 9/097* (2006.01)

(52) U.S. Cl.
CPC ....... *G03G 15/206* (2013.01); *G03G 9/08797* (2013.01); *G03G 9/09708* (2013.01); *G03G 15/2053* (2013.01); *G03G 15/2064* (2013.01); *G03G 2215/2032* (2013.01); *G03G 2215/2038* (2013.01)

(58) Field of Classification Search
USPC .................................................. 399/328, 329
See application file for complete search history.

(56) References Cited

U.S. PATENT DOCUMENTS

2019/0235428 A1* 8/2019 Yabuki ............... G03G 15/2064

FOREIGN PATENT DOCUMENTS

| | | | | |
|---|---|---|---|---|
| JP | 01263244 A | 10/1989 | | |
| JP | 04110439 A | 4/1992 | | |
| JP | 2001265145 A | * 9/2001 | .......... | G03G 9/0804 |
| JP | 2008255283 A | 10/2008 | | |
| JP | 2009122317 A | 6/2009 | | |
| JP | 201325120 A | 2/2013 | | |

OTHER PUBLICATIONS

JP2001-265145A translation; Isobe Kazuya; Sep. 28, 2001 (Year: 2001).*

* cited by examiner

*Primary Examiner* — Quana Grainger
(74) *Attorney, Agent, or Firm* — Boone IP Law, PLLC

(57) ABSTRACT

Disclosed is an image forming system including a fixing device that fixes a toner image onto a recording medium. The fixing device includes: a belt; and a roller that includes: a first roller that stretches the belt; or a first roller that stretches the belt, and a second roller rotatably disposed in pressure contact with an outer peripheral surface of the belt, at least one of the roller includes a base body containing aluminum as a main component, the base body contains silicon in an amount exceeding 0.60% by mass, a standard deviation of a shape factor of toner base particles is 0.045 or less, and a variation coefficient of a volume average particle size of the toner base particles is 28.0% or less.

8 Claims, 6 Drawing Sheets

IMAGE FORMING SYSTEM WITH TONER AND FIXING DEVICE

CROSS-REFERENCE TO RELATED APPLICATIONS

The entire disclosure of Japanese Patent Application No. 2024-037127 filed on Mar. 11, 2024, is incorporated herein by reference in its entirety.

BACKGROUND OF THE INVENTION

Technical Field

The present invention relates to an image forming system. In particular, the present invention relates to an image forming system that, during high-speed operation of a fixing device, can suppress deterioration of fixability and degradation of a roller and a belt of the fixing device due to slip of the roller of the fixing device and can obtain a satisfactory image even in a low-temperature environment.

Description of Related Art

In recent years, energy saving and productivity have been regarded as important in an image forming system using an electrophotographic method. In particular, in high-speed printing, a fixing belt made of a material having a small heat capacity is used to ensure smooth recovery from a sleep mode. In addition, an image forming system including a so-called belt-type fixing device in which a belt is heated by an aluminum heating roller having good heat conductivity from the inside or outside of the belt has become mainstream.

However, in such a belt-type fixing system, the rotation of the heating roller cannot keep up with the rotation of the belt during high-speed operation. This can cause the roller to slip, which in some cases may result in failure of fixing or deterioration of the belt during long-term use.

To solve such a problem, it is effective to roughen the surface of the aluminum roller. Protruded portions on the surface produced by the roughening treatment exert an anchoring effect on a belt base material, making it easier for the roller to rotate with the movement of the belt.

In addition, the use of a heating roller with a resin-coated layer or a rubber layer on the surface of the aluminum base body is also effective in promoting the roller to rotate with the belt. In this case, the resin-coated layer or the rubber layer may peel off during long-term use. However, when the surface of the aluminum base body is roughened, the resin-coated layer and the rubber layer are less likely to peel off due to the anchoring effect. As a result, the effectiveness of promoting the roller to rotate with the belt is maintained even in long-term use. As a method for roughening the surface of an aluminum base body, a method for performing cutting or blasting on the aluminum base body is known. However, such a method can increase the number of steps of the surface roughening treatment, leading to deterioration of the productivity. In order to carry out the surface roughening treatment without deteriorating the productivity, it is desirable that the roughened structure is chemically obtained in the existing process.

Incidentally, as disclosed in, for example, JP 04-110439A and JP 01-263244A, an aluminum alloy used as a heating roller and its base body often includes silicon. When an aluminum alloy containing a large amount of silicon is used, protruded portions are formed on the surface of the aluminum base body due to a eutectic reaction between Si and Al, so that an anchoring effect can be expected even without the surface roughening treatment. However, since silicon decreases the heat conductivity, increasing the amount of silicon deteriorates the fixability in some cases. In a low-temperature environment, in particular, heat from a heat source or heat transferred to the belt is easily removed by air, and the surface temperature of the belt is difficult to recover, so that the fixability is remarkably deteriorated in some cases.

SUMMARY OF THE INVENTION

The present invention has been made in consideration of the above-mentioned problems and situations. Objects of the present invention includes providing an image forming system that, during high-speed operation of a fixing device, can suppress deterioration of fixability and degradation of a roller and a belt of the fixing device due to slip of the roller of the fixing device and can obtain a satisfactory image even in a low-temperature environment.

To achieve at least one of the abovementioned objects, an image forming system reflecting one aspect of the present invention comprises a fixing device that fixes a toner image onto a recording medium, wherein the fixing device includes: a belt; and a first roller, or a first roller and a second roller, the first roller stretches the belt or the fixing device, the second roller is rotatably disposed in pressure contact with an outer peripheral surface of the belt, at least one of the roller includes a base body containing aluminum as a main component, the base body contains silicon in an amount exceeding 0.60% by mass, a standard deviation of a shape factor of toner base particles is 0.045 or less, and a variation coefficient of a volume average particle size of the toner base particles is 28.0% or less.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1:
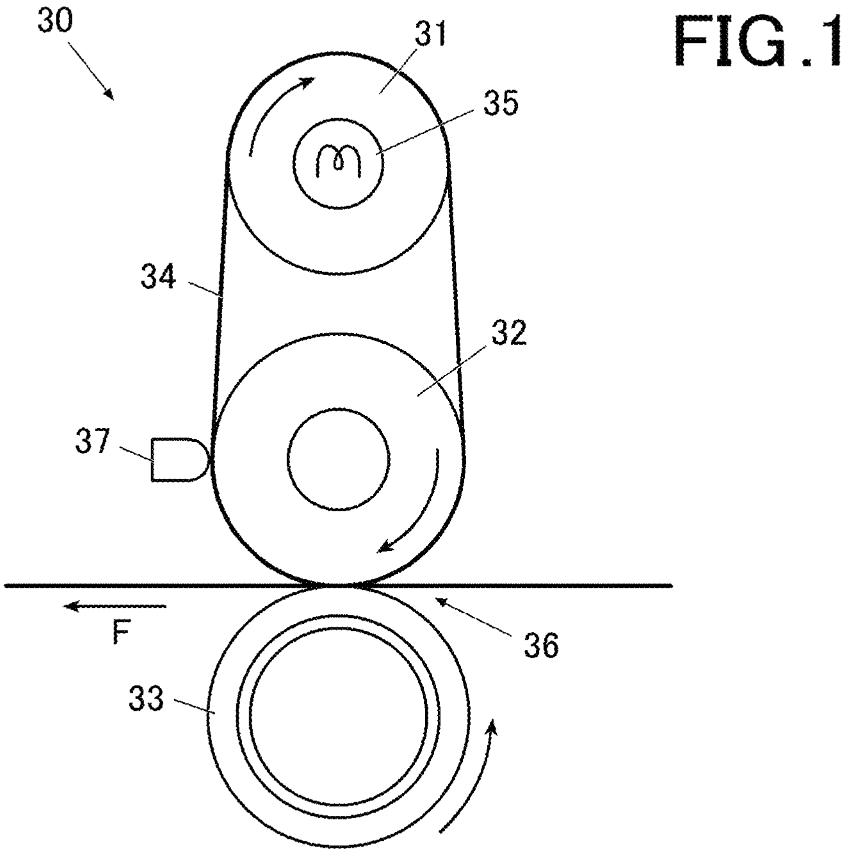
FIG. 1 is a schematic side view of a fixing device according to a first embodiment.

Hereinafter, one or more embodiments of the present invention will be described with reference to the drawings. However, the scope of the invention is not limited to the disclosed embodiments.

An image forming system according to the present embodiment includes a fixing device that fixes a toner image onto a recording medium, wherein the fixing device includes: a belt; and a first roller, or a first roller and a second roller, the first roller stretches the belt or the fixing device, the second roller is rotatably disposed in pressure contact with an outer peripheral surface of the belt, at least one of the roller includes a base body containing aluminum as a main component, the base body contains silicon in an amount exceeding 0.60% by mass, a standard deviation of a shape factor of toner base particles is 0.045 or less, and a variation coefficient of a volume average particle size of the toner base particles is 28.0% or less.

The above-described features are technical features common to or corresponding to the following embodiments.

In an embodiment of the present invention, it is preferable that the base body includes an amount of silicon more than 0.80% by mass from the viewpoint that processability is good and the surface of the base body becomes uniform.

It is preferable that a pressure roller is disposed outside the belt and a pad is disposed inside the belt so as to face the pressure roller so that a nip is formed by sandwiching the belt between the pressure roller and the pad. As a result, the region of the nip becomes wide, the heating becomes sufficient, and the fixability becomes satisfactory.

It is preferable that a heat source for heating the belt is disposed inside at least one of the roller from the viewpoint of sufficient heating and satisfactory fixability.

It is preferable that a resin-coated layer or a rubber layer is disposed on a surface of at least one of the roller from the viewpoint of suppressing slip of the roller.

It is preferable that the toner image is heated in a non-contact manner by a heater before the toner image is fixed onto the recording medium, from the viewpoint of sufficient heating and satisfactory fixability.

It is preferable that the toner base particles contain a crystalline resin in an amount within a range of 5.0 to 20% by mass of binder resins from the viewpoint of improving the sharp melt properties of a toner and further suppressing occurrence of the melting delay of the toner base particles. When the content of the crystalline resin is 5.0% by mass or more, low-temperature fixability becomes satisfactory. In addition, when the content of the crystalline resin is 20% by mass or less, heat-resistant storage stability is excellent.

It is preferable to add, as an external additive, strontium titanate particles having a number average particle size in a range of 10 to 60 nm to the toner base particles. Due to a polishing effect of the strontium titanate particles, it is possible to prevent the relatively small size toner, which is easily melted, from being attached to the belt. As a result, the durability of the belt is improved.

Hereinafter, the present invention and constituent elements thereof, and modes and aspects for carrying out the present invention will be described. In the present description, when two figures are used to indicate a range of value before and after "to", these figures are included in the range as a lower limit value and an upper limit value.

Overview of Image Forming System of Present Embodiment

The image forming system according to the present embodiment includes a fixing device that fixes a toner image onto a recording medium, wherein the fixing device includes: a belt; and a first roller, or a first roller and a second roller, the first roller stretches the belt or the fixing device, the second roller is rotatably disposed in pressure contact with an outer peripheral surface of the belt, at least one of the roller includes a base body containing aluminum as a main component, the base body contains silicon in an amount exceeding 0.60% by mass, a standard deviation of a shape factor of toner base particles is 0.045 or less, and a variation coefficient of a volume average particle size of the toner base particles is 28.0% or less.

In the present specification, the term "toner" refers to an electrostatic charge image developing toner. The toner includes toner particles each including a toner base particle and an external additive disposed on the surface of the toner base particle.

The "toner base particle" constitutes the base of the toner particle. The "toner base particles" according to the present embodiment include at least binding resin and may include other constituent components, such as a colorant, a release agent (wax), and a charge control agent, if necessary. The "toner base particles" are referred to as the "toner particles" by addition of an external additive. The "toner" refers to an aggregate of the toner particles.

A "toner image" refers to a state of the toner aggregated as an image.

<Rollers>

In the present embodiment, at least one of the rollers constituting the fixing device includes a base body containing aluminum (Al) as a main component.

The phrase "containing aluminum as a main component" means that the content of Al is 80% by mass or more with respect to the total mass of the entire base body. In particular, the content of Al is preferably in a range of 85 to 99% by mass with respect to the total mass of the entire base body.

Furthermore, the base body includes silicon (Si).

The silicon content is more than 0.60% by mass with respect to the total mass of the entire base body.

When the silicon content in the base body is 0.60% by mass or less, processability is deteriorated and the surface becomes uneven. Therefore, from the viewpoint of processability, the silicon content is more than 0.60% by mass, and preferably more than 0.80% by mass. In addition, in order to obtain a sufficient number of protrusions from silicon crystals, the silicon content is more preferably 1.50% by mass or more, and particularly preferably 1.80% by mass or more.

On the other hand, when the silicon content exceeds 12.6% by mass, coarse crystals are likely to be generated due to a eutectic reaction between alumina and silicon. Therefore, the belt, and the resin-coated layer and the rubber layer formed on the base body are easily deteriorated by being brought into pressure contact with protrusions on the surface of the base body formed by the coarse crystals. Therefore, the silicon content is preferably 12.6% by mass or less. On the other hand, when the silicon content exceeds 3.0% by mass, the influence on the deterioration of the fixability becomes large. Therefore, the silicon content is more preferably 3.0% by mass or less.

The silicon content in the base body is measured by high-frequency inductively coupled plasma emission spectrometry.

The high-frequency inductively coupled plasma emission spectrometry (inductively coupled plasma) is a method in which a solution sample obtained by dissolving a metal in an acid, an alkali, or the like is sprayed into Ar plasma, excited and emitted light is dispersed into respective wavelengths, and the type and content of elements are quantified from the light intensity.

In this method, the light intensity and the content are in a linear relationship from a trace amount region to a high concentration region, and each element can be analyzed simultaneously.

As a measurement apparatus for the high-frequency inductively coupled plasma emission spectrometry. "ULTIMA2000 (manufactured by Horiba. Ltd.)" can be used. As the above measurement apparatus, an emission spectrometer with an argon atmosphere discharge emission stand, an emission spectrometer with an atmosphere discharge emission stand, a glow discharge mass spectrometer (GD-MS), an X-ray fluorescence spectrometer (XRF), and the like may also be used.

When a coating layer of a resin or the like is present on the base body, the measurement is performed after suitably removing the coating layer with a solvent or the like.

The base body is preferably made of an aluminum alloy, and may contain Fe. Cu. Mn. Mg. Ti, or the like in addition to Al and Si.

It is preferable that Fe is 0.7% by mass or less. Cu is in a range of 0.05 to 0.2% by mass. Mn is 0.9% by mass or less, and Ti. Zn, and Cr are 0.1% by mass or less with respect to the total mass of the entire base body.

In the present embodiment, the "aluminum alloy" refers to an alloy in which the content of aluminum (Al) is 50% by mass or more with respect to the entire alloy.

In the present embodiment, it is preferable that a resin-coated layer or a rubber layer is disposed on a surface of at least one of the rollers in that slip of the rollers can be suppressed. Furthermore, both a resin-coated layer and a rubber layer may be disposed on a surface of the roller. In this case, it is preferable to dispose the rubber layer and the resin-coated layer in this order on the surface of the roller.

(Resin-Coated Layer)

The resin-coated layer is preferably formed of a resin having heat resistance (heat-resistant resin) or a fluorine-based resin.

The term "heat resistance" as used in the present embodiment means sufficiently stable exhibition of a desired physical property without deformation at a temperature used for fixing a toner image onto a recording medium in an electrophotographic image formation.

The temperature is, for example, in a range of 150 to 220° C.

The heat-resistant resin is suitably selected from resins that are not substantially denatured or deformed at the above use temperature, and one type or a combination of two or more types may be used.

Examples of the heat-resistant resin that can be applied to the present embodiment include silicone resin, polyphenylene sulfide, polyarylate, and polysulfone. Examples of the heat-resistant resin include polyether sulfone, polyether imide, polyimide, polyamide imide, and polyether ether ketone. Among them, from the viewpoint of heat resistance, polyimide and silicone resin are preferable as the heat-resistant resin.

The polyimide is obtained, for example, by heating polyamic acid, which is a precursor of polyimide, at 200° C., or higher, or by promoting a dehydration and cyclization (imidization) reaction of polyamic acid using a catalyst.

The polyamic acid may be produced by dissolving a tetracarboxylic dianhydride and a diamine compound in a solvent, followed by mixing and heating for a polycondensation reaction, or a commercially available product may be used.

Examples of the diamine compound and the tetracarboxylic dianhydride include compounds described in paragraphs (0123) to (0130) of JP 2013-25120A.

As the silicone resin, for example, a silicone resin or the like in which addition reaction type silicone and a catalyst are mixed is preferably used. Examples of commercially available products of the addition reaction type silicone include "SD7333" (manufactured by Dow Corning Toray Co., Ltd). Examples of commercially available products of the catalysts include "SRX212" (manufactured by Dow Corning Toray Co., Ltd).

The content of the heat-resistant resin is preferably within a range of 40 to 100% by mass with respect to the entire resin-coated layer.

Examples of the fluorine-based resin contained in the resin-coated layer include perfluoroalkoxy (PFA) fluorine-based resin and tetrafluoroethylene-hexafluoropropylene (FEP) copolymer. In addition, examples of the fluorine-based resin include a tetrafluoroethylene-ethylene (ETFE) copolymer, a perfluoropolyether (PFPE) compound and the like.

The fluorine-based resin is more preferably perfluoroalkoxy (PFA) fluorine-based resin which is a copolymer of tetrafluoroethylene and perfluoroalkoxyethylene. Specifically, the fluorine-based resin is a perfluoroalkoxy (PFA) fluorine-based resin in the form of a film or a tube, and for example, soft PFA manufactured by Du Pont-Mitsui Fluorochemicals Co., Ltd, may be applied in a tube shape.

In addition, as a commercially available product of the fluorine-based resin, for example, a fluorinated acrylic resin "Novec2702" (manufactured by 3M Co., Ltd.) can be used.

The content of the fluorine-based resin is preferably in a range of 10 to 100% by mass with respect to the entire resin-coated layer.

The thickness of the resin-coated layer is, for example, preferably in a range of 5 to 500 μm, more preferably in a range of 10 to 200 μm, from the viewpoint of sufficiently exhibiting thermal conductivity and elasticity.

(Rubber Layer)

The rubber layer is made of, for example, an elastic material.

Examples of the elastic material applicable to the present embodiment include an elastic resin material, and examples thereof include a silicone rubber, a thermoplastic elastomer, and a rubber material.

Among them, the elastic material is preferably a silicone rubber from the viewpoint of heat resistance in addition to desired elastic properties.

A single type or two or more types of the silicone rubber may be used. Examples of the silicone rubber which can be applied to the present embodiment include polyorganosiloxane or a heat-cured product thereof, and an addition reaction type silicone rubber described in JP 2009-122317A.

Examples of the polyorganosiloxane include dimethylpolysiloxane described in JP 2008-255283A, both ends of which are blocked with trimethylsiloxane groups and side chains of which have vinyl groups.

The thickness of the rubber layer is, for example, preferably within a range of 5 to 1000 μm, and more preferably within a range of 50 to 500 μm, from the viewpoint of sufficiently exhibiting thermal conductivity and elasticity.

The rubber layer may further include a component other than the elastic resin material described above as long as the desired effects of the present embodiment can be obtained.

For example, the rubber layer may contain, in addition to the elastic material, a heat-conductive filler for increasing the thermal conductivity of the elastic layer. Examples of the material of the filler include silica, metal silicon, alumina, zinc, aluminum nitride, boron nitride, silicon nitride, silicon carbide, carbon, and graphite. The form of the filler is not limited, and examples include spherical powder, amorphous powder, flat powder, and fibrous form.

The content of the elastic resin material in the elastic material constituting the rubber layer is preferably within a range of 60 to 100 volume % with respect to the total volume of the rubber layer, from the perspective of achieving both thermal conductivity and elasticity.

<Shape Factor of Toner Base Particle>

The standard deviation of the shape factor of the toner base particles according to the present embodiment is 0.045 or less. The standard deviation of the shape factor is more preferably 0.035 or less, and particularly preferably 0.030 or less, from the viewpoint of uniform contact with the belt.

Furthermore, the shape factor of the toner base particles is preferably in a range of 0.920 to 0.995 and more preferably in a range of 0.940 to 0.975.

The shape factor of the toner base particles indicates the degree of roundness of the toner base particles. The shape factor is calculated by taking a photograph of the toner base particles magnified 2000 times by a scanning electron microscope and analyzing the image using an image analysis system such as an image processing and analyzing device "LUZEX AP" (manufactured by Nireco Corporation).

At this point, particles that are not fully visible, such as toner particles that are partly hidden behind (overlapped with) other toner base particles and toner particles at the end of the field of view, are excluded. Then. 100 toner base particles are randomly selected from the fully visible particles to be measured. Note that the toner base particles excluding fine particles of 2 μm or less are targeted. From the photographic image obtained above, the shape factor is calculated by the following formula.

Shape factor=(Perimeter of a circle having the same projected area as the particle image)/(Perimeter of the particle projection image)

After the shape factors are calculated for the 100 toner base particles, an average shape factor is calculated. The average shape factor is an arithmetic average value obtained by adding the shape factors of the respective particles and dividing the sum by the total number of the measured particles. The average shape factor is defined as the shape factor of the toner base particles according to the present embodiment. The average shape factor in the examples described below was also calculated by the above-described method.

In addition to the above-described method, for example, the measurement can also be performed using a flow particle image analyzer "FPIA 3000" (manufactured by Sysmex Corporation). In this case, the shape factor is obtained by using the toner base particles with fine particles of 2 μm or less removed from the toner particles, or by removing the measurement values of particles of 2 μm or less from the measurement result of all the toner particles.

From the shape factors of the toner particles calculated as described above, the standard deviation can be calculated by the following formula (1).

Formula (1)

[Expression 1]

$$\text{Standard deviation } s = \sqrt{\frac{1}{n}\sum_{i=1}^{n}(x_i - \bar{x})^2}$$

($n$: total number of data, $x_i$: individual values, $\bar{x}$: average value)

In a chemical method such as an emulsion aggregation method or a suspension polymerization method, the variation coefficient (coefficient of variation) of the shape factor of the toner base particles can be adjusted by, for example, the content of a surfactant, the pH of a dispersion medium, the acid value of a resin, stirring conditions, and the like. On the other hand, in a pulverization method, the variation coefficient of the shape factor of the toner base particles can be adjusted by, for example, airflow conditions such as the temperature of cold air, the type and content of a release agent, and the like.

Further, regardless of the production method, the variation coefficient of the shape factor can be adjusted by mixing toner particles having different average circularities.

In an emulsion aggregation method, the shape factor of the toner base particles can be adjusted by the heating temperature, the heating time, the content of a surfactant, the pH of a dispersion medium, the acid value of a resin, the molecular weight of the resin, the composition of the resin, stirring conditions, and the like.

For example, in an emulsion aggregation method, increasing the rotation speed during dispersion decreases the aggregation speed and facilitates uniform aggregation, resulting in a smaller variation coefficient of the shape factor of the toner base particles. On the other hand, decreasing the rotation speed during dispersion increases the aggregation speed, making aggregation more uneven and resulting in a larger variation coefficient of the shape factor of the toner base particles.

In addition, in an emulsion aggregation method, increasing the amount of the surfactant added decreases the aggregation speed and facilitates uniform aggregation, resulting in a smaller variation coefficient of the shape factor of the toner base particles. On the other hand, decreasing the amount of the surfactant added increases the aggregation speed, making aggregation more uneven and resulting in a larger variation coefficient of the shape factor of the toner base particles.

In a pulverization method, the control range greatly varies depending on the type of the pulverization apparatus. In order to reduce the shape factor of the toner base particles, a jet mill is preferably used. To increase the shape factor of the toner base particles, a mechanical pulverizer (T-250, manufactured by Turbo Kogyo Co., Ltd) is preferably used.

When a jet mill is used, the shape factor can be controlled by adjusting airflow conditions such as the temperature of cold air.

Similarly, when a turbo mill is used, the shape factor can be controlled by adjusting airflow conditions such as the temperature of cold air.

In both the jet mill and the turbo mill, the lower the temperature, the lower the shape factor.

As the cold air, dehumidified dry air is preferably used. Since dew condensation occurs by lowering the temperature, it is necessary to use dry air.

As the airflow condition of the jet mill, the cold air temperature is preferably in a range of −15 to 5° C.

As the airflow condition of the turbo mill, the cold air temperature is preferably in a range of −15 to 5° C.

In addition, the shape factor of the toner base particles can be further increased by processing the toner base particles with a spheroidization processing apparatus in order to promote spheroidization. Examples of the spheroidization processing apparatus include ANGMILL (manufactured by Hosokawa Micron Corporation).

When the temperature is increased, the resin is softened, and thus the shape of the toner base particles is rounded, that is, the shape factor is increased.

<Volume Average Particle Size of Toner Base Particles>

The variation coefficient of the volume average particle size (volume-based median size) of the toner base particles according to the present embodiment is 28.0% or less. The variation coefficient is preferably 24.0% or less, and particularly preferably 22.0% or less, from the viewpoint of uniform melting of the toner base particles.

Furthermore, the volume average particle size of the toner base particles is preferably in a range of 3.0 to 10.0 μm.

The volume average particle size of the toner base particles is measured and calculated using an apparatus in which a computer system (manufactured by Beckman Coulter. Inc.) equipped with the data-processing software "Software V3.51" is coupled to "Multisizer 3 Coulter Counter" (manufactured by Beckman Coulter, Inc.).

The measurement procedure is as follows. 0.02 g of a toner is wet with 20 mL of a surfactant solution and then subjected to ultrasonic dispersion for 1 minute to prepare a toner dispersion liquid. The surfactant solution is, for example, a surfactant solution obtained by diluting a neutral detergent containing a surfactant component with pure water by a factor of 10 for the purpose of dispersing the toner.

The prepared toner dispersion liquid is injected into a beaker containing ISOTON II (manufactured by Beckman Coulter. Inc.) in a sample stand with a pipette until the concentration indicated by the measuring instrument becomes 5% to 10%.

Within this concentration range, a reproducible measurement value can be obtained. In the measurement apparatus, the measured particle count is set to 25.000, the aperture diameter is set to 100 μm, the frequency value is calculated by dividing the measurement range of 2.0 to 60 μm into 256, and the particle size at which the volume cumulative fraction reaches 50% is defined as the volume-based median size (volume D50% size).

From the volume average particle size of the toner base particles calculated as described above, the variation coefficient of the volume average particle size can be calculated by the following formula (2).

$$\text{Variation coefficient of volume average particle size (\%)} = (Si/K) \times 100 \quad \text{Formula (2):}$$

In the above formula, the Si represents the standard deviation of the volume average particle sizes of 100 toner base particles. The K represents the average value of the volume average particle sizes of 100 toner base particles. Note that the standard deviation of the volume average particle sizes can also be calculated based on Formula (1) in the same manner as the standard deviation of the shape factors of the toner base particles described above.

In a chemical method such as an emulsion aggregation method or a suspension polymerization method, the variation coefficient of the volume average particle size of the toner base particles can be adjusted by, for example, the content of a surfactant, the pH of a dispersion medium, the acid value of a resin, stirring conditions, and the like. On the other hand, in a pulverization method, the adjustment can be achieved by changing, for example, airflow conditions such as the temperature of cold air, resin composition, the type and content of a release agent, and the like.

Further, regardless of the production method, the adjustment can be achieved by mixing toner particles having different volume average particle sizes.

In addition, in order for the variation coefficient of the shape factor and the variation coefficient of the volume average particle size to meet the conditions defined in the present embodiment, in a chemical method such as an emulsion aggregation method or a suspension polymerization method, the adjustment can be achieved by changing, for example, the content of a surfactant, the pH of a dispersion medium, the acid value of a resin, the molecular weight of the resin, the composition of the resin, and stirring conditions.

For example, in a chemical method, increasing the rotation speed during dispersion decreases the aggregation speed and facilitates uniform aggregation, resulting in a smaller variation in the volume average particle size of the toner base particles. On the other hand, decreasing the rotation speed during dispersion increases the aggregation speed, making aggregation more uneven and resulting in a larger variation in the volume average particle size of the toner base particles.

In addition, in a chemical method, increasing the amount of the surfactant added decreases the aggregation speed and facilitates uniform aggregation, resulting in a smaller variation in the volume average particle size of the toner base particles.

On the other hand, decreasing the amount of the surfactant added increases the aggregation speed, making aggregation more uneven and resulting in a larger variation in the volume average particle size of the toner base particles.

Further, in a pulverization method, the adjustment can be achieved by changing, for example, airflow conditions such as the temperature of cold air, resin composition, the type and content of a release agent, and the like.

When particles having an equivalent circle diameter of 2 μm or less are excluded in the shape factor measurement of the toner particles to which an external additive has been added, the shape factor of the toner base particles is substantially the same as the shape factor of the toner particles. Furthermore, in this case, the volume average particle size of the toner base particles is also substantially the same as the volume average particle size of the toner particles, and therefore they can be treated as the same.

[Fixing Device]

(1) First Embodiment

FIG. 1 is a schematic side view of a fixing device 30 according to a first embodiment of the present invention.

The fixing device 30 illustrated in FIG. 1 includes a heating roller 31, an upper pressure roller 32, a lower pressure roller 33, and an endless belt (also referred to as a "fixing belt") 34. Note that in the drawing, an arrow F indicates a conveyance direction of a sheet (recording medium). The same applies to the other drawings.

The heating roller 31 and the upper pressure roller 32 correspond to the "rollers" according to the present embodiment.

At least one of the heating roller 31 and the upper pressure roller 32 includes a base body containing aluminum as a main component, and the base body contains silicon in an amount exceeding 0.60% by mass. The constituent materials of the heating roller 31 and the upper pressure roller 32 will be described later.

The heating roller 31 includes a rotatable sleeve serving as the base body, and a heater (heat source) 35 disposed inside the sleeve. The heating roller 31 heats the belt 34 with the heater 35.

As the heater 35, for example, a halogen heater or the like can be used.

The upper pressure roller 32 presses the belt 34 toward a fixing nip (nip portion) 36.

The fixing nip 36 is formed by a portion of the belt 34 pressed by the upper pressure roller 32 and the lower pressure roller 33.

The lower pressure roller 33 rotates in synchronization with the upper pressure roller 32.

The lower pressure roller 33 presses a sheet passing through the fixing nip 36 against the belt 34. A driving force from a drive source is transmitted to the upper pressure roller 32 and the lower pressure roller 33, and the upper pressure roller 32 and the lower pressure roller 33 rotate in synchronization with each other. The heating roller 31 is driven to rotate by the movement of the belt 34 that moves with the rotation of the upper pressure roller 32.

The belt 34 is an endless belt that is in contact with and stretched around the heating roller 31 and the upper pressure roller 32. The belt 34 is preferably formed by, for example, forming a silicone rubber layer on a polyimide base material and further forming a fluorine material as a surface layer, and details thereof will be described later.

The belt 34 is heated by the heating roller 31 and transfers heat to the fixing nip 36 by the movement of the belt 34 to heat and press a sheet nipped and conveyed by the fixing nip 36, thereby fixing an unfixed toner image to the sheet.

Furthermore, the fixing device 30 preferably includes a temperature sensor 37 that is in contact with the belt 34 to measure a temperature.

The temperature sensor 37 is disposed adjacent to the fixing nip 36 to measure the temperature of the fixing nip 36.

A signal from the temperature sensor 37 is transmitted to a controller (not illustrated). Note that the temperature sensor 37 may be disposed at any position where the temperature of the fixing nip 36 can be measured, and the position is not limited to downstream of the movement direction of the belt 34. For example, the temperature sensor 37 may be disposed upstream of the movement direction of the fixing nip 36. The temperature sensor 37 may be of a non-contact type.

The controller controls the output of the halogen heater, that is, the heating temperature for fixing, based on the signal from the temperature sensor 37.

<Constituent Materials of Heating Roller and Upper Pressure Roller>

At least one of the heating roller 31 and the upper pressure roller 32, which are the rollers according to the present embodiment, includes a base body containing aluminum as a main component, and the base body contains silicon in an amount exceeding 0.60% by mass. In the present embodiment, it is preferable that both the heating roller 31 and the upper pressure roller 32 include a base body containing aluminum as a main component, and the base body contains silicon in an amount exceeding 0.60% by mass.

It is also preferable that a resin-coated layer or a rubber layer is disposed on a surface of at least one of the rollers in that slip of the rollers can be suppressed.

Specifically, it is preferable that the sleeve of the heating roller 31 is formed of the base body, and a resin-coated layer or a rubber layer is disposed on a surface of the base body.

Furthermore, it is preferable that the sleeve of the upper pressure roller 32 is also formed of the base body, and a resin-coated layer or a rubber layer is disposed on a surface of the base body.

The resin-coated layer and the rubber layer are as described above, and hence description thereof is omitted herein.

The lower pressure roller 33 is preferably configured such that, for example, a silicone rubber layer is formed on a surface of a cored bar made of aluminum or stainless steel, and a surface of the silicone rubber layer is coated with a fluorine material. Similarly to the upper pressure roller, a cored bar of the lower pressure roller 33 may be formed of a base body that contains aluminum as a main component and silicon in an amount exceeding 0.60% by mass.

<Constituent Material of Belt>

The belt 34 preferably includes at least a base material, an elastic layer, and a thermoplastic resin layer in this order.

The belt 34 may include an adhesive layer having an adhesive function between the elastic layer and the outermost layer.

(Base Material)

The base material forming the belt is made of a resin having heat resistance (heat-resistant resin).

The heat-resistant resin is suitably selected from resins that are not substantially denatured or deformed at the use temperature (about 150 to 220° C.), and one type or a combination of two or more types may be used.

Examples of the heat-resistant resin applicable to the present embodiment include the same heat-resistant resins as those used in the resin-coated layer of the rollers described above, and polyimide is particularly preferable. The heat-resistant resin is a main material constituting the base material, and the content thereof should be sufficient to form the base material. The content of the heat-resistant resin in the base material is preferably 40 to 100 volume % of the total volume of the base material from the viewpoint of moldability at the time of producing the base material.

The base material may further include a component other than the heat-resistant resin as long as the desired effects of the present embodiment can be obtained. For example, the constituent materials of the base material may include a filler in addition to the heat-resistant resin.

The filler is, for example, a component that contributes to improvement of at least one of hardness, thermal conductivity, and electric conductivity of the base material. One type or two or more types of the filler may be used, and examples of the filler include carbon black. Ketjenblack, nanocarbon, and graphite.

In the present embodiment, when the content of the filler in the base material is too large, the toughness of the base material may be lowered, and the fixability and separability of the belt may be lowered. On the other hand, when the content of the filler is too small, the desired effects of the filler, such as imparting suitable electrical conductivity, may be insufficient. From this viewpoint, the content of the filler in the base material is preferably 3% by mass or more, more preferably 4% by mass or more, and still more preferably 5% by mass or more. Further, from the above viewpoint, the upper limit of the content of the filler in the base material is preferably 30% by mass or less, more preferably 20% by mass or less, and still more preferably 10% by mass or less.

(Elastic Layer)

The elastic layer constituting the belt according to the present embodiment is an elastic layer that contributes to improving the contact at the nip between the surface of the belt and a recording medium carrying an unfixed toner image. The elastic layer is made of, for example, an elastic material.

Examples of the elastic material applicable to the present embodiment may include an elastic resin material. Examples of the elastic resin material include the same elastic resin materials as those used for the rubber layer of the rollers described above, and silicone rubber is particularly preferable.

The thickness of the elastic layer is, for example, preferably within a range of 5 to 500 μm, and more preferably within a range of 50 to 400 μm, from the viewpoint of sufficiently exhibiting thermal conductivity and elasticity.

Similarly to the rubber layer of the rollers, the elastic layer may further include a component other than the clastic resin material described above, and for example, may include a heat-conductive filler.

The content of the elastic resin material in the elastic material constituting the elastic layer is preferably within a range of 60 to 100 volume % with respect to the total volume of the elastic layer, from the perspective of achieving both thermal conductivity and elasticity. Furthermore, the content of the elastic resin material is more preferably 75 to 100 volume %, and still more preferably 80 to 100 volume %, with respect to the total volume of the elastic layer (Thermoplastic Resin Layer: Outermost Layer)

In the thermoplastic resin layer constituting the outermost layer of the belt according to the present embodiment (hereinafter, also referred to simply as the outermost layer), one of thermoplastic resins is preferably a fluorine-based resin.

(Thermoplastic Resin)

In the present embodiment, the thermoplastic resins constituting the outermost layer of the belt are not particularly limited as long as the thermoplastic resins have necessary heat resistance and releasability.

Example of the thermoplastic resins include for example, a vinyl thermoplastic resin (e.g., polyvinyl chloride, polyvinylidene chloride, polyvinyl alcohol, and the like), polystyrene-based thermoplastic resins (e.g., polystyrene, styrene-acrylonitrile copolymer, acrylonitrile-butadiene-styrene copolymer (ABS), polyethylene, ethylene-vinyl acetate copolymer, and the like), polypropylene, polyacetals, acrylic thermoplastic resins (e.g., polymethyl methacrylate, methacrylate-styrene copolymer, and the like), polycarbonate, polyamide-based thermoplastic resin, polyurethane-based thermoplastic resin, fluorine-based thermoplastic resins (e.g., trifluorochloroethylene (PCTFE), tetrafluoroethylene (PTFE), tetrafluoroethylene-hexafluoropropylene copolymer (FEP), tetrafluoroethylene-ethylene copolymer (ETFE), perfluoroalkoxy fluorine resin (PFA), perfluoropolyether compounds (PFPE), and the like).

As the heat resistance required of the thermoplastic resin, a fluorine-based resin is particularly preferable in that high releasability is required continuously at about 150° C., or more from the viewpoint of low-temperature fixing of the toner.

(2) Second Embodiment

Figure 2:
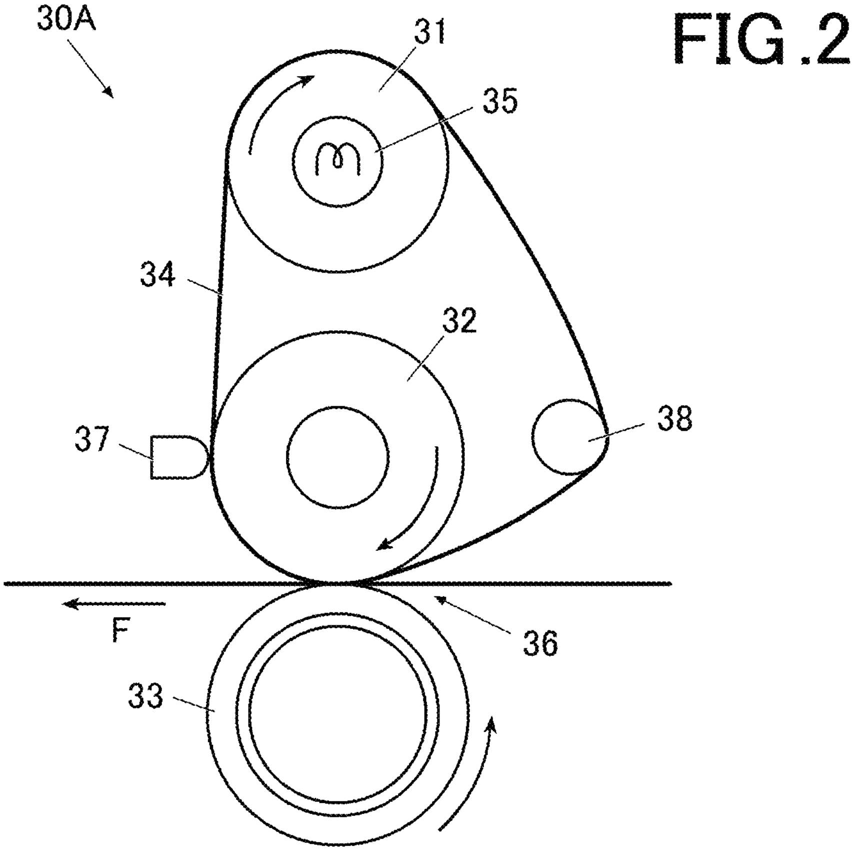
FIG. 2 is a schematic side view of a fixing device according to a second embodiment.

FIG. 2 is a schematic side view of a fixing device 30A according to a second embodiment of the present invention.

Similarly to the fixing device 30 illustrated in FIG. 1, the fixing device 30A illustrated in FIG. 2 includes the heating roller 31, upper pressure roller 32, lower pressure roller 33, and endless belt 34.

The fixing device 30A further includes an auxiliary roller 38 that changes the position of the belt 34. The auxiliary roller 38 is disposed adjacent to the upper pressure roller 32. The width of a fixing nip 36 can be changed by the position of the auxiliary roller 38 without changing the tension of the belt 34. The auxiliary roller 38 may also include, similarly to the heating roller 31, a base body containing aluminum as a main component and the base material may contain silicon in an amount exceeding 0.60% by mass. Furthermore, a resin-coated layer or a rubber layer may be disposed on a surface of the base body.

(3) Third Embodiment

Figure 3:
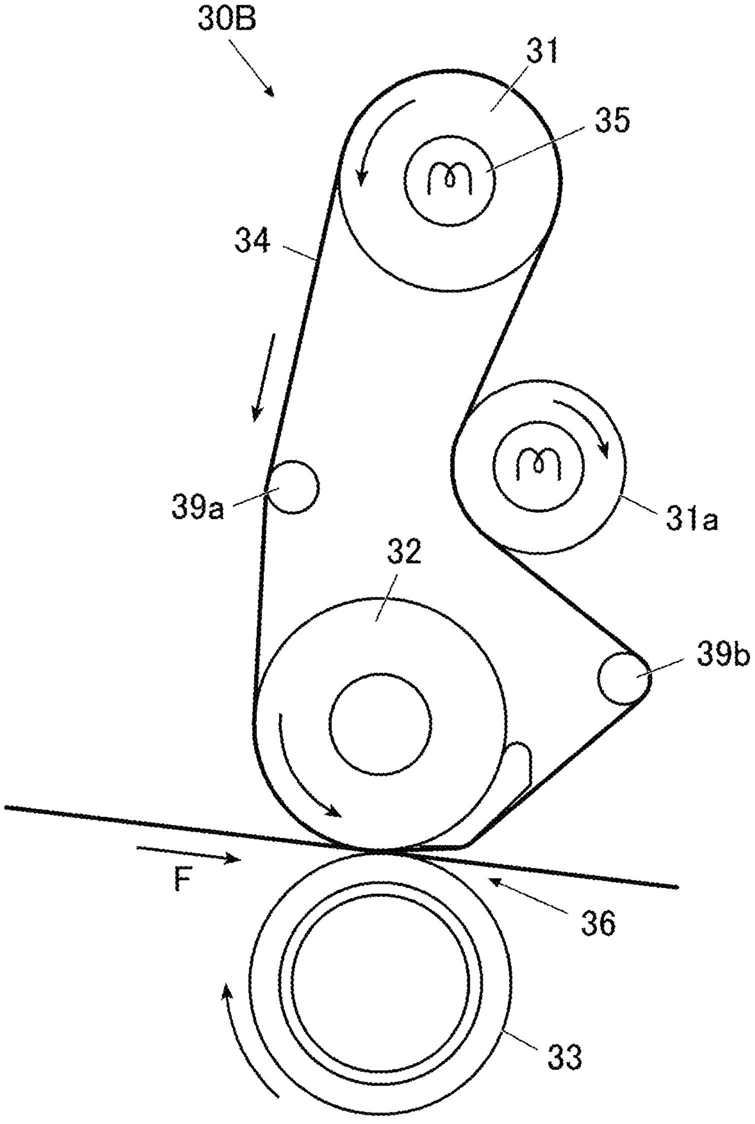
FIG. 3 is a schematic side view of a fixing device according to a third embodiment.

FIG. 3 is a schematic side view of a fixing device 30B according to a third embodiment of the present invention.

Similarly to the fixing device 30 illustrated in FIG. 1, the fixing device 30B illustrated in FIG. 3 includes the heating roller 31, upper pressure roller 32, lower pressure roller 33, and endless belt 34.

The fixing device 30B further includes two tension rollers 39*a* and 39*b* around which the belt 34 is stretched, and a second heating roller 31*a* disposed outside the belt 34.

The second heating roller 31*a* is rotatably disposed in pressure contact with the outer peripheral surface of the belt 34 and heats the outer peripheral surface of the belt 34.

The two tension rollers 39*a* and 39*b* and the second heating roller 31*a* also include, similarly to the heating roller 31, a base body containing aluminum as a main component, and the base body may contain silicone in an amount exceeding 0.60% by mass Furthermore, a resin-coated layer or a rubber layer may be disposed on a surface of the base body.

(4) Fourth Embodiment

Figure 4A:
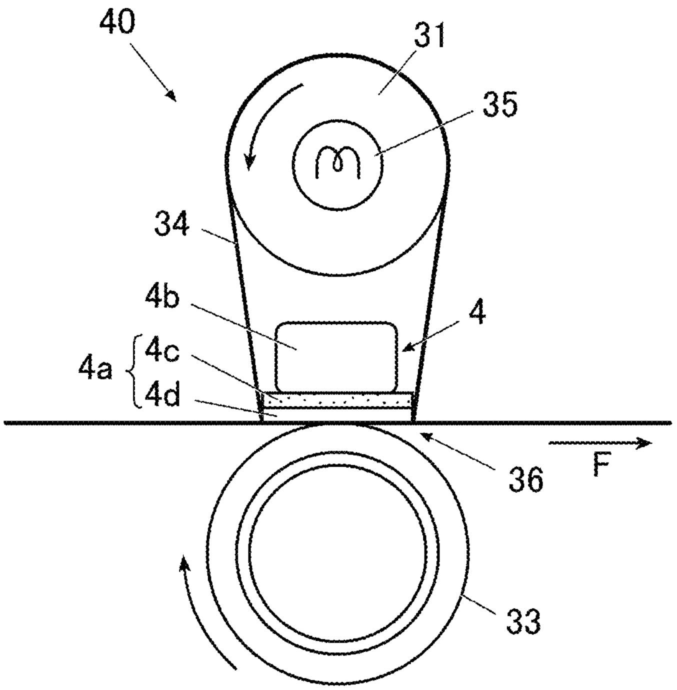
FIG. 4A is a schematic side view of a fixing device according to a fourth embodiment when a sheet passes through the fixing device.
Figure 4B:
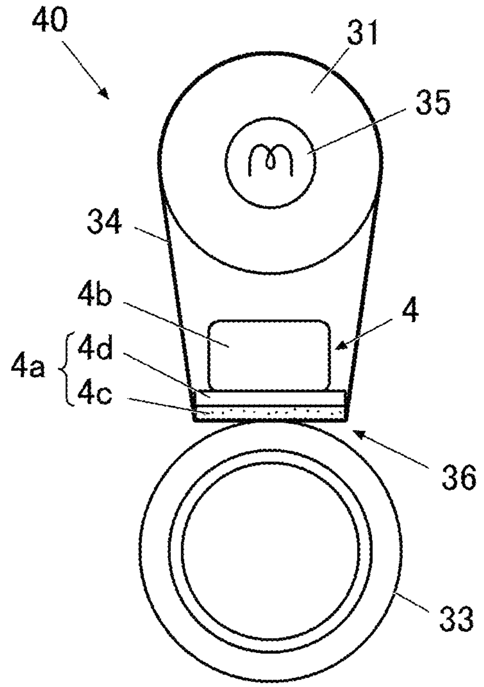
FIG. 4B is a schematic side view of the fixing device according to the fourth embodiment during warm-up.

FIGS. 4A and 4B are schematic side views of a fixing device 40 according to a fourth embodiment of the present invention.

The fixing device 40 illustrated in FIGS. 4A and 4B includes the lower pressure roller 33, fixing pad 4, and belt 34.

The lower pressure roller 33 is the same as the lower pressure roller 33 of the fixing device 30 illustrated in FIG. 1, and the belt 34 is the same as the belt 34 of the fixing device 30 illustrated in FIG. 1.

The lower pressure roller 33 is disposed outside the belt 34 and the fixing pad 4 is disposed inside the belt 34 so as to face the lower pressure roller 33 so that a fixing nip 36 is formed by sandwiching the belt 34 between the lower pressure roller 33 and the fixing pad 4. That is, a fixing nip 36 is formed by a portion of the belt 34 pressed by the fixing pad 4 and the lower pressure roller 33.

The fixing pad 4 presses the belt 34 toward the fixing nip 36. Thus, the fixing nip 36 can be widened by providing the fixing pad 4 instead of the upper pressure roller 31 of the fixing device 30 illustrated in FIG. 1. As a result, the heating becomes sufficient and the fixability becomes satisfactory.

The fixing pad 4 includes a pad member 4*a* that is in contact with the belt member 34 and a pad base material 4*b* that supports the pad member 4*a* from behind.

The pad member 4*a* has a plate shape.

The pad member 4*a* is preferably formed by stacking a heat insulating layer (low heat conductive layer) 4*c* formed of a member having high heat insulating properties on a heat transfer layer (high heat conductive layer) 4*d* having heat conductivity superior to that of the heat insulating layer.

The heat insulating layer 4*c* can be made of a material having a relatively low heat conductivity. Examples of the material having a low heat conductivity include a heat-resistant resin material such as low-heat-conductive silicone rubber, polyphenylene sulfide (PPS), liquid crystal polymer (LCP), and polyethylene terephthalate (PET). As the material, a material having a particularly small heat capacity: such as a porous material, is advantageous for shortening a warm-up time.

The heat transfer layer 4*d* is preferably made of a material having a relatively high heat conductivity. Examples of the material having a high heat conductivity include metal such as aluminum (Al), copper (Cu), and iron (Fe), and a graphite sheet.

The heat conductivity of the heat insulating layer 4*c* is preferably 1.0 W/m. K or less, and the heat conductivity of the heat transfer layer 4*d* is preferably 50 W/m. K or more.

In the present embodiment, it is preferable that the pad member 4*a* includes a switching mechanism for switching the surfaces of the heat insulating layer 4*c* and the heat transfer layer 4*d* that contact the belt 34.

Figure 5:
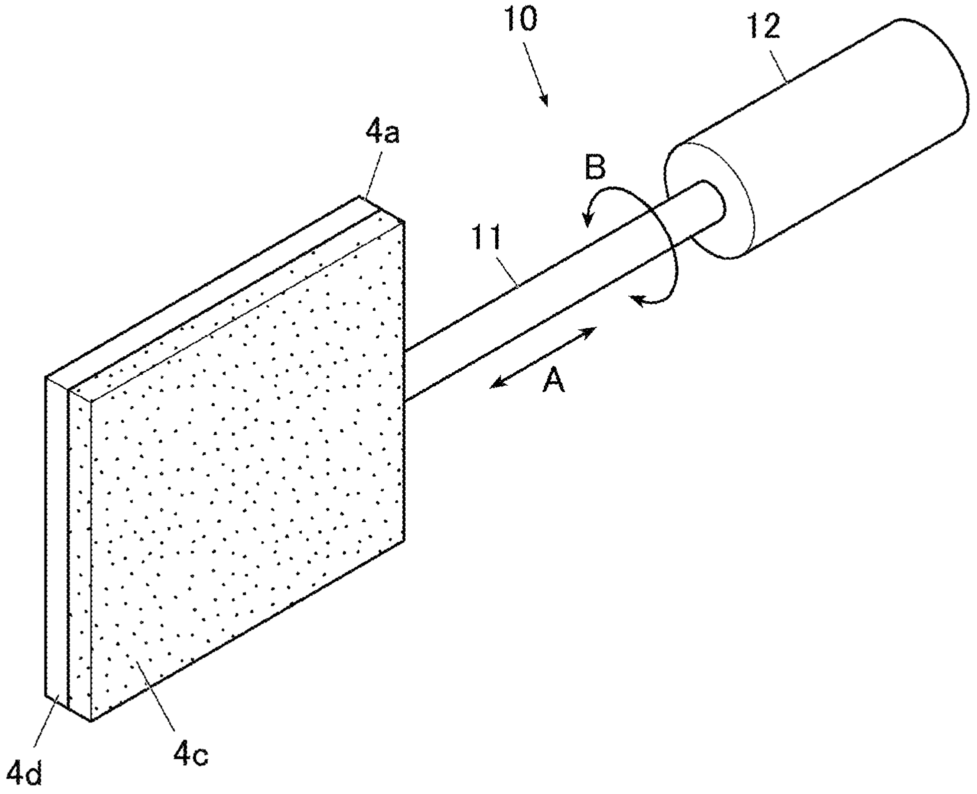
FIG. 5 is a perspective view of a switching mechanism.

FIG. 5 is a perspective view of the switching mechanism 10.

In FIG. 5, the switching mechanism 10 includes an actuator 12 formed by connecting a drive shaft 11 to the pad member 4*a*. The axis of the drive shaft 11 extends in a direction perpendicular to the drawings of FIG. 4A and FIG. 4B. The actuator 12 fixed to a frame of an image forming apparatus is configured such that the pad member ta can be removed and inserted by driving the drive shaft 11 in the direction of arrow A, and the pad member 4*a* can be inverted by rotating the drive shaft 11 in the direction of arrow B.

The pad base material 4*b* is made of a metal such as Al. Fe, or stainless steel.

Here, during a warm-up operation illustrated in FIG. 4B, it is preferable to set the pad member 4*a* to a first position where the surface of the heat insulating layer 4*c* of the pad member 4*a* faces the lower pressure roller 33 with the belt 34 interposed therebetween (a position where the surface of the low heat conductive layer is in contact with the belt 34).

At this point, the heat insulating layer 4*c* is in contact with the belt 34, but the heat transfer layer 4*d* is not in contact with the belt 34. Therefore, the transfer of heat from the belt 34 to the pad member 4*a* is suppressed and the warm-up time is shortened, whereby a start-up time can be shortened and energy saving can be achieved.

On the other hand, during a printing operation, as illustrated in FIG. 4A, it is preferable to set the pad member 4*a* to a second position where the surface of the heat transfer layer 4*d* of the pad member 4*a* faces the lower pressure roller 33 with the belt 34 interposed therebetween (a position where the surface of the high heat conductive layer is in contact with the belt 34).

At this point, the heat transfer layer 4*d* is in contact with the belt 34, but the heat insulating layer 4*c* is not in contact with the belt 34. Therefore, especially during continuous passage of small-size sheets, where it is necessary to suppress temperature unevenness in the sheet passing width direction, the smooth transfer of heat from the belt 34 to the pad member 4*a* effectively suppresses a temperature rise in a non-passing region, thereby suppressing printing unevenness and forming high-quality images.

That is, it is possible to achieve both suppression of heat transfer to the pad 4*a* during the warm-up and maintenance of heat conduction in the sheet passing width direction during the printing operation, which are usually opposed to each other.

The belt 34 is not in contact with the heat transfer layer 4*d* at the first position and is not contact with the heat insulating layer 4*c* at the second position. However, to an extent that does not affect heat transfer, the belt 34 may be in contact with the heat transfer layer 4*d* at the first position in a small region and with the heat insulating layer 4*c* at the second position in a small region.

(5) Others

Figure 6:
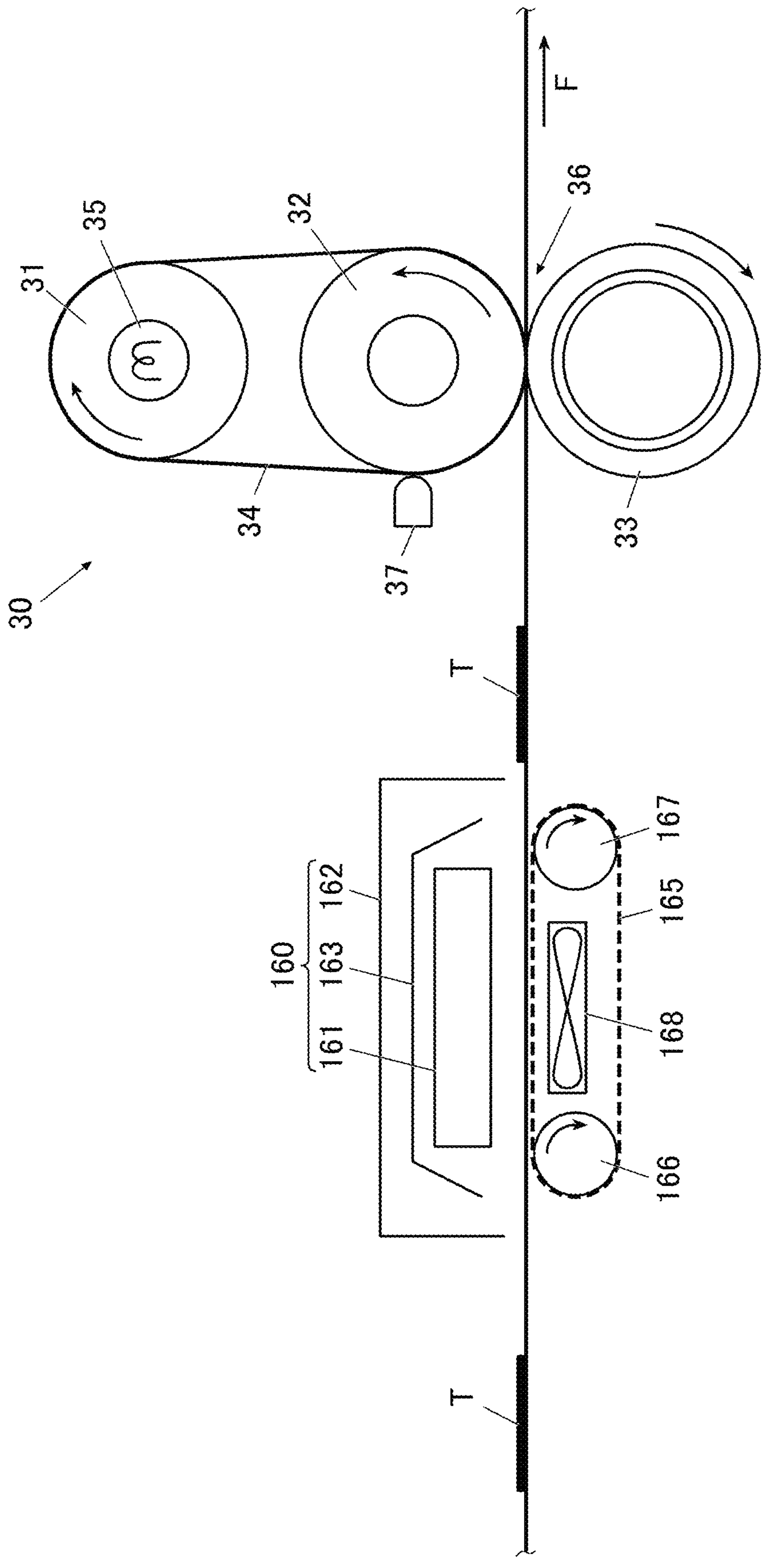
FIG. 6 is a schematic side view of the fixing device and a non-contact heating section according to the first embodiment.

FIG. 6 is a cross-sectional view of a major portion illustrating the fixing device 30 and a non-contact heating section 160 according to the first embodiment.

In FIG. 6, the non-contact heating section 160 for fixing a toner image T onto a sheet before the toner image T on the sheet is fixed by the fixing device 30 is disposed upstream of the fixing device 30 in the conveyance direction.

Note that the fixing device 30 illustrated in FIG. 6 has the same configuration as the fixing device 30 illustrated in FIG. 1, and therefore, description thereof is omitted, and here, only the non-contact heating section 160 is described.

The non-contact heating section 160 includes a non-contact heater 161, a heat insulating cover 162, and a sheet conveyance means.

The non-contact heater 161 heats an image surface of the sheet in a non-contact manner.

The heat insulating cover 162 covers the non-contact heater 161 except for a side facing the image surface.

The sheet conveyance means is disposed vertically below a sheet passing path of the non-contact heater 161.

The non-contact heater 161 is disposed inside the heat insulating cover 162, and the surface temperature is controlled to a desired temperature by a control means (not shown).

The wavelength of the non-contact heater 161 is preferably as long as possible, taking into account differences in light absorption of the black, yellow, magenta, and cyan toners and a non-image portion. The non-contact heater 161 is preferably a ceramic heater, a halogen heater, or the like, taking into account the balance with the energy density.

A reflecting plate 163 for condensing light is disposed above the non-contact heater 161 in order to increase heating efficiency. As the reflecting plate 163, aluminum or the like processed into a mirror surface may be used.

As the heat insulating cover 162 for keeping the surroundings of the non-contact heater 161 at a high temperature, a material having high heat insulating properties and high heat resistance such as ceramic fiber may be used. Further, in order to improve the volatilization efficiency of a carrier liquid, it is necessary to lower the saturated vapor pressure of a volatilized carrier liquid. Therefore, an air flow means (not shown) for ventilating the volatilized carrier liquid (vapor) from the surroundings of the non-contact heater 161 to the outside may be disposed directly below the non-contact heater 161.

As the sheet conveyance means, a suction belt 165 is used in the present embodiment. The suction belt 165 is disposed vertically below the sheet passing path when viewed from the non-contact heater 161, has suction holes formed in a highly heat-resistant rubber material such as silicone rubber, and is wound around a drive roller 166 and a driven roller 167.

The drive roller 166 is rotationally driven by a drive mechanism (not illustrated) in a clockwise direction in FIG. 6 at a predetermined circumferential speed.

As the drive roller 166 and the driven roller 167, for example, metal rollers made of aluminum or the like may be used, and their positional relationship with respect to a sheet conveyance direction may be reversed.

Inside the suction belt 165 (between the drive roller 166 and the driven roller 167), a suction fan 168 is disposed to suction a sheet being conveyed.

In the non-contact heating section 160, the toner image T and the sheet are heated mainly by radiation from the non-contact heater 161.

After passing through the non-contact heating section 160, the toner image T on the sheet reaches the fixing device 30.

[Image Forming Apparatus]

The "image forming system" according to the present embodiment refers to an assembly that includes a device or an apparatus having a predetermined function as a means element necessary in each step of image formation, an electrostatic charge image developing toner, and the like, and performs an image forming function as a whole.

It is to be noted that the respective means elements may be individually disposed at different places apart from each other or may be collectively disposed in a certain space as one device to be integrally formed as a system device.

The image forming system according to the present embodiment is a system for forming an image by using the fixing device described above and the electrostatic charge image developing toner described below.

Hereinafter, for illustrative purposes, an apparatus that includes an image forming section described later, the fixing device, and the like is particularly referred to as an "electrophotographic image forming apparatus".

A typical electrophotographic image forming apparatus that can be used in the present embodiment is described below. The electrophotographic image forming apparatus is also simply referred to as an "image forming apparatus".

Figure 7:
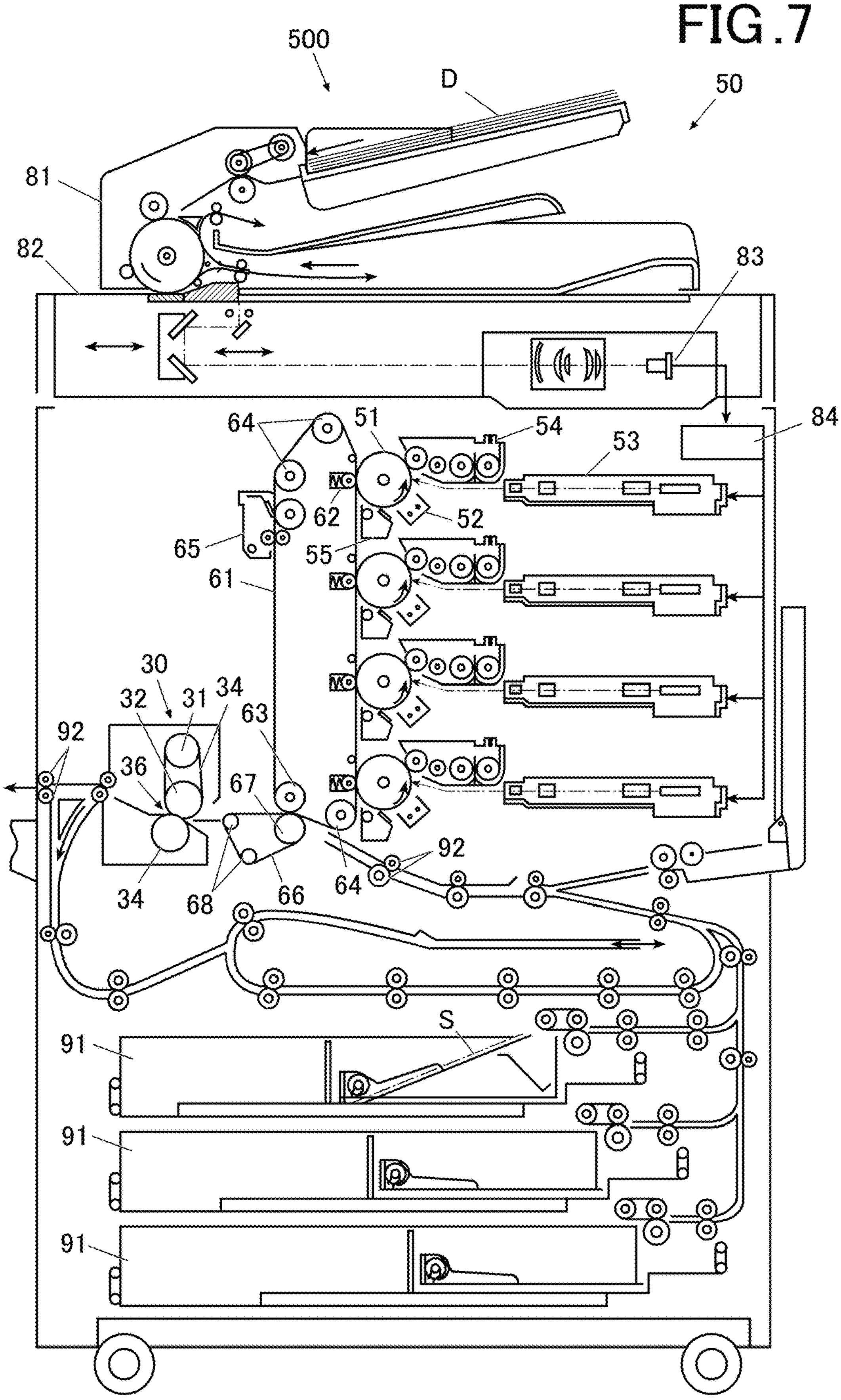
FIG. 7 is a schematic diagram illustrating an overall configuration of an image forming apparatus.

FIG. 7 is a schematic diagram illustrating an overall configuration of an image forming apparatus applicable to the present embodiment.

The image forming apparatus according to the present embodiment includes the fixing device for fixing an unfixed toner image formed on a recording medium by an electrophotographic method onto the recording medium by heating and pressing.

The image forming apparatus can be configured similarly to a known image forming apparatus except that the above-described fixing device is adopted. Hereinafter, an example of the image forming apparatus according to the present embodiment will be described with reference to FIG. 7.

As illustrated in FIG. 7, the image forming apparatus 50 includes an image forming section, an intermediate transfer section, the fixing device 30, an image reading section, and a recording medium conveyance section.

The image forming section includes, for example, four image forming units corresponding to respective colors of yellow, magenta, cyan, and black.

As illustrated in FIG. 7, each of the image forming units includes: a photosensitive drum 51: a charging device 52 that charges the photosensitive drum 51: an exposure device 53 that forms an electrostatic latent image by irradiating the charged photosensitive drum 51 with light: a developing device 54 that forms a toner image according to the electrostatic latent image by supplying a toner to the photosensitive drum 51 on which the electrostatic latent image is formed; and a cleaning device 55 that removes a residual toner on the photosensitive drum 51.

The photosensitive drum 51 is, for example, a negatively charged organic photoreceptor having photoconductivity.

The charging device 52 is, for example, a corona charging device.

The charging device 52 may be a contact charging device that charges the photosensitive drum 51 by bringing a contact charging member, such as a charging roller, a charging brush, or a charging blade, into contact with the photosensitive drum 51.

The exposure device 53 includes, for example, a semiconductor laser.

The developing device 54 is, for example, a known developing device in an electrophotographic image forming apparatus.

The intermediate transfer section includes a primary transfer unit and a secondary transfer unit.

The primary transfer unit includes an intermediate transfer belt 61, a primary transfer roller 62, a backup roller 63, a plurality of support rollers 64, and a cleaning device 65.

The intermediate transfer belt 61 is an endless belt.

The intermediate transfer belt 61 is stretched in a loop shape by the backup roller 63 and the support rollers 64.

When at least one of the backup roller 63 and the support rollers 64 is rotationally driven, the intermediate transfer belt 61 is rotated to travel in one direction on an endless track at a constant speed.

The secondary transfer unit includes a secondary transfer belt 66, a secondary transfer roller 67, and a plurality of support rollers 68.

The secondary transfer belt 66 is also an endless belt.

The secondary transfer belt 66 is stretched in a loop shape by the secondary transfer roller 67 and the support rollers 68.

As the fixing device 30, for example, the fixing device 30 illustrated in FIG. 1 can be adopted, but the above-described fixing devices 30A. 30B. 40, and the like other than the fixing device 30 may be adopted.

A sheet S corresponds to the recording medium.

The image reading section includes a sheet feed device 81, a scanner 82, a CCD sensor 83, and an image processor 84.

The recording medium conveyance section includes three sheet feed tray units 91 and a plurality of registration roller pairs 92.

Each of the sheet feed tray unit 91 houses a predetermined kind of sheets S (standard sheets, special sheets) identified based on the basis weight, the size, and the like.

Each of the registration roller pairs 92 is disposed so as to form an intended conveyance path.

An image forming system 500 is a system for forming an image by using the fixing device 30 and the electrostatic charge image developing toner described later.

[Image Forming Method]

An image forming method according to the present embodiment includes a step of fixing an unfixed toner image formed on a recording medium by an electrophotographic method onto the recording medium by heating and pressing using the fixing device.

The image forming method can be performed by the above image forming apparatus 50.

As an example of the image forming method, formation of an image by the image forming apparatus 50 is described below.

The scanner 82 optically scans and reads a document D on a contact glass sent from the sheet feed device 81.

The reflected light from the document D is read by the CCD sensor 83 as input image data.

The input image data is subjected to predetermined image processing in the image processing section 84 and sent to the exposure device 53.

On the other hand, the photosensitive drum 51 rotates at a constant circumferential speed corresponding to a printing speed of 60 sheets/min or more for an A4-size recording medium.

The charging device 52 uniformly and negatively charges a surface of the photosensitive drum 51.

The exposure device 53 irradiates the photosensitive drum 51 with laser light corresponding to the input image data of each color component.

Thus, an electrostatic latent image is formed on the surface of the photosensitive drum 51.

The developing device 54 visualizes the electrostatic latent image by attaching a toner to the surface of the photosensitive drum 51.

Thus, a toner image is formed on the surface of the photosensitive drum 51 according to the electrostatic latent image.

The toner image on the surface of the photosensitive drum 51 is transferred to the intermediate transfer belt 61.

A transfer residual toner on the photosensitive drum 51 is removed by the cleaning device 55.

The toner images of the respective colors formed on the respective photosensitive drums 51 are sequentially transferred to the intermediate transfer belt 61 in a superimposed manner.

On the one hand, the secondary transfer roller 67 presses the secondary transfer belt 66 against the backup roller 63, bringing the secondary transfer belt 66 into pressure contact with the intermediate transfer belt 61. As a result, a secondary transfer nip is formed.

On the other hand, the sheet S is conveyed from the sheet feed tray unit 91 to the secondary transfer nip via the registration roller pairs 92.

The registration roller pairs 92 correct the inclination of the sheet S and adjust the timing of conveyance.

When the sheet S is conveyed to the secondary transfer nip, a transfer voltage is applied to the secondary transfer roller 67, and the toner image on the intermediate transfer belt 61 is transferred to the sheet S.

The sheet S having the toner image transferred thereon is conveyed to the fixing device 70 by the secondary transfer belt 66.

A transfer residual toner on the intermediate transfer belt 61 is removed by the cleaning device 65.

In the fixing device 30, the belt 34 rotates at a constant speed corresponding to a printing speed of 60 sheets/min or more for an A4-size recording medium. When the sheet S is conveyed, as described above, the lower pressure roller 33 forms the fixing nip 36 with the belt 34.

The sheet S is heated and pressed at the fixing nip 36 and then guided to the outside of the image forming apparatus 50 for discharge. As described above, a toner image is formed on a sheet S, and the sheet S is discharged to the outside of the apparatus.

[Electrostatic Charge Image Developing Toner]

Next, the toner used in the image forming system according to the present embodiment will be described.

As described above, in the toner according to the present embodiment, the standard deviation of the shape factor of the toner base particles is 0.045 or less, and the variation coefficient of the volume average particle size of the toner base particles is 28.0% or less.

The method for calculating the standard deviation of the shape factor of the toner base particles and the variation coefficient of the volume average particle size of the toner base particles is as described above.

The toner according to the present embodiment includes toner particles each including a toner base particle and an external additive externally added to the toner base particle.

Furthermore, the toner base particles preferably contain a crystalline resin in a range of 5.0 to 20% by mass of binder resins.

Further, it is preferable to add strontium titanate particles having a number average particle size in a range of 10 to 60 nm as an external additive to the toner base particles, from the viewpoint of effectively exhibiting a polishing force.

<Toner Base Particles>

The toner base particles contain a binder resin.

The binder resin is a resin having a function of binding toner particles to a recording medium.

The toner base particles according to the present embodiment preferably contain an amorphous resin and a crystalline resin as the binder resin. The binder resin may include an amorphous resin alone, but it is preferable that the binder resin contains a crystalline resin in a range of 5.0 to 20% by mass.

<Amorphous Resin>

The amorphous resin preferably contains a vinyl resin, a urethane resin, a urea resin, or the like. In the present embodiment, the amorphous resin is particularly preferably a vinyl-based resin. This is because a vinyl-based resin has a main chain composed of a carbon chain and thus is difficult to be compatible with a crystalline polyester resin preferably used in a crystalline resin described later, and therefore compatibility between the amorphous resin and the crystalline resin can be further suppressed.

In the present embodiment, the amorphous resin is a resin that has no melting point and a relatively high glass transition temperature (Tg) when the resin is subjected to differential scanning calorimetry (DSC).

In the DSC measurement. Tg1 of the amorphous resin is preferably 35 to 80° C., where Tg1 is a glass transition temperature in a first heating process and Tg2 is a glass transition temperature in a second heating process. In particular. Tg1 is preferably 45 to 65° C.

Tg2 of the amorphous resin is preferably 20 to 70° C., and particularly preferably 30 to 55° C.

(Vinyl-Based Resin)

The vinyl-based resin is a resin obtained by polymerization using at least a vinyl-based monomer.

Examples of the amorphous vinyl-based resin include an acrylic resin and a styrene-acrylic resin. Among them, as a non-crystalline vinyl-based resin, a styrene-acrylic resin formed using a styrene-based monomer and a (meth)acrylic acid ester-based monomer is preferable.

Examples of the styrene-based monomer and the (meth) acrylic acid ester-based monomer capable of forming the styrene-acrylic resin are shown below. However, those usable for forming the styrene-acrylic resin used in the present embodiment are not limited to those shown below.

(1) Styrene-Based Monomer

Examples of the styrene-based monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, p-n-dodecylstyrene, and derivatives thereof. These styrene-based monomers can be used alone or in combination of two or more.

(2) (Meth)Acrylic Acid Ester-Based Monomer

Examples of the (meth)acrylate ester-based monomer include: acrylic acid ester monomers such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; and methacrylic acid esters such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

The content of the styrene-acrylic resin is preferably 70% by mass or more with respect to the total amount of the binder resin. Within this range, an effect of improving chargeability can be sufficiently exhibited.

Note that as the polymerizable monomer, a third polymerizable monomer can also be used in addition to the above-described polymerizable monomers. Examples of the third polymerizable monomer include an acid monomer such as acrylic acid, methacrylic acid, maleic anhydride, and vinylacetic acid. Examples of the third polymerizable monomer also include acrylamide, methacrylamide, acrylonitrile, ethylene, propylene, butylene vinyl chloride. N-vinylpyrrolidone, and butadiene.

Further, as the third polymerizable monomer, a polyfunctional vinyl monomer may be used. Examples of the polyfunctional vinyl monomer include diacrylates such as ethylene glycol, propylene glycol, butylene glycol, and hexylene glycol, and dimethacrylates and trimethacrylates of tertiary and higher alcohols such as divinylbenzene, pentaerythritol, and trimethylolpropane.

(Method for Producing Styrene-Acrylic Resin)

The styrene-acrylic resin is preferably produced by an emulsion polymerization method. Emulsion polymerization can be obtained by dispersing a polymerizable monomer such as styrene or an acrylic acid ester in an aqueous medium described later and polymerizing the monomer. In order to disperse the polymerizable monomer in the aqueous medium, a surfactant is preferably used, and a known polymerization initiator or chain transfer agent can be used for polymerization.

(Polymerization Initiator)

As the polymerization initiator, various known polymerization initiators are suitably used.

Examples of the polymerization initiator include: peroxides such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, di-t-butyl peroxide, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, and tert-butyl per-N-(3-toluyl) palmitate; and azo compounds such as 2,2'-azobis (2-aminodipropane) hydrochloride, 2,2'-azobis-(2-aminodipropane) nitrate. 1,1'-azobis (sodium 1-methylbutyronitrile-3-sulfonate), 4,4'-azobis-4-cyanovaleric acid, and poly (tetraethyleneglycol-2,2'-azobisisobutyrate).

(Chain Transfer Agent)

The chain transfer agent is not particularly limited, and for example, mercaptans such as octyl mercaptan, dodecyl mercaptan, alkyl mercaptan, and t-dodecyl mercaptan can be used. In addition, as the chain transfer agent, mercaptopropionic acid such as n-octyl-3-mercaptopropionate and stearyl-3-mercaptopropionate, mercapto fatty acid ester, styrene dimer and the like can be used. These may be used alone or in combination of two or more.

The weight average molecular weight (Mw) of the amorphous resin measured by gel permeation chromatography (GPC) is preferably in a range of 10000 to 100000. In the present embodiment, the molecular weight of the amorphous resin is measured by GPC as follows.

A measurement sample (amorphous resin) is dissolved in tetrahydrofuran to a concentration of 1 mg/mL under a dissolution condition in which treatment is performed for 5 minutes at room temperature using an ultrasonic disperser. Next, the mixture is treated with a membrane filter having a pore size of 0.2 μm to obtain a sample solution. An apparatus "HLC-8120GPC" (manufactured by Tosoh Corporation) and a column "TSKguardcolumn+TSKgel SuperHZM-M3 series" (manufactured by Tosoh Corporation) are used. While maintaining the column temperature at 40° C., tetrahydrofuran (THF) is flowed as a carrier solvent at a flow rate of 0.2 mL/min, and 10 μL of the sample solution prepared above is injected into the apparatus together with the carrier solvent. Then, the measurement sample is detected using a refractive index detector (RI detector), and the molecular weight distribution of the measurement sample is calculated using a calibration curve measured using monodisperse polystyrene standard particles. Ten polystyrene standards are used for the calibration curve measurement.

When a hybrid crystalline polyester resin described later is contained as the crystalline resin, it is preferable to contain, as the amorphous resin, the same type of resin as the amorphous resin used for the hybrid crystalline polyester resin.

Here, "the same type of resin" means that a characteristic chemical bond is commonly included in a repeating unit.

Here, the "characteristic chemical bond" refers to the "polymer classification" described in the National Institute for Materials Science (NIMS) substance/material database.

The substance/material database is located at http://polymer.nims.go.jp/PoLyInfo/guide/jp/term_polymer.html.

That is, a chemical bond constituting a polymer classified into a total of 22 types, including polyacryl, polyamide, polyanhydride, polycarbonate, polydiene, polyester, poly haloolefin, polyimide, polyimine, polyketone, polyolefin, polyether, polyphenylene, polyphosphazene, polysiloxane, polystyrene, polysulfide, polysulfone, polyurethane, polyurea, polyvinyl, and other polymers, is referred to as the "characteristic chemical bond".

In addition, in a case where the resin is a copolymer. "the same type of resin" refers to a resin having a characteristic chemical bond in common when a monomer species having the chemical bond is used as a constituent unit in the chemical structure of a plurality of monomer species constituting the copolymer. Therefore, even when resins themselves have different properties or when the molar component ratios of monomer species constituting a copolymer are different from each other, the resins are regarded as the same type of resin as long as the resins have a characteristic chemical bond in common.

For example, a resin (or resin segment) formed by styrene, butyl acrylate, and acrylic acid and a resin (or resin segment) formed by styrene, butyl acrylate, and methacrylic acid are the same type of resin because they have at least a chemical bond constituting polyacrylic. Furthermore, for example, a resin (or resin segment) formed by styrene, butyl acrylate, and acrylic acid and a resin (or resin segment) formed by styrene, butyl acrylate, acrylic acid, terephthalic acid, and fumaric acid have at least a chemical bond constituting polyacrylic as a common chemical bond. Therefore, these are the same type of resin.

<Crystalline Resin>

The crystalline resin according to the present embodiment preferably contains a hybrid crystalline polyester resin in which a crystalline polyester resin and an amorphous resin are chemically bonded.

When the toner according to the present embodiment contains a hybrid crystalline polyester resin, the hybrid crystalline polyester resin is preferably contained in the toner base particles in a range of 5 to 30% by mass. The hybrid crystalline polyester resin is more preferably contained in the toner base particles in a range of 10 to 20% by mass.

When the hybrid crystalline polyester resin is contained in the toner base particles in an amount of 30% by mass or less, it is possible to avoid the presence of a polyester resin that cannot completely grow crystals. Therefore, crystals can be sufficiently grown during fixing.

On the other hand, when the hybrid crystalline polyester resin is contained in the toner base particles in an amount of 5% by mass or more, a sufficient amount of the hybrid crystalline polyester resin necessary for crystallization can be secured. As a result, crystals can be sufficiently grown during fixing.

Note that the crystalline resin is a resin having a clear endothermic peak rather than a stepwise endothermic change in differential scanning calorimetry (DSC). The clear endothermic peak specifically means a peak having a half-value width of the endothermic peak of 15° C., or less when measured, for example, at a heating rate of 10° C./min in differential scanning calorimetry (DSC).

<Crystalline Polyester Resin>

The crystalline polyester resin is a crystalline resin obtained by a polycondensation reaction of a divalent or higher-valent carboxylic acid (polyvalent carboxylic acid compound) and a divalent or higher-valent alcohol (polyhydric alcohol compound).

The polyvalent carboxylic acid compound is a compound having two or more carboxyl groups in one molecule, and an alkyl ester, an acid anhydride, and an acid chloride of the polyvalent carboxylic acid compound can be used.

Examples of the polyvalent carboxylic acid compound includes divalent carboxylic acids, and trivalent or higher-valent carboxylic acids, or the polyvalent carboxylic acid compound may be a combination thereof. Examples of the divalent carboxylic acids include oxalic, succinic, maleic, adipic. β-methyladipic, azelaic, sebacic, nonanedicarboxylic, decanedicarboxylic, undecanedicarboxylic, dodecanedicarboxylic, fumaric, citraconic, diglycolic, cyclohexane-3,5-diene-1,2-dicarboxylic, malic, citric, hexahydroterephthalic, malonic, pimelic, tartaric, mucic, phthalic, isophthalic, terephthalic, tetrachlorophthalic, chlorophthalic, nitrophthalic, p-carboxyphenylacetic, p-phenylenediacetic, m-phenylenediglycolic, p-phenylenediglycolic, o-phenylenediglycolic, diphenylacetic, diphenyl-p,p'-dicarboxylic, naphthalene-1,4-dicarboxylic, naphthalene-1, 5-dicarboxylic, naphthalene-2,6-dicarboxylic, anthracenedicarboxylic, and dodecenylsuccinic acids. Examples of the trivalent or higher-valent carboxylic acids include trimellitic, pyromellitic, naphthalenetricarboxylic, naphthalenetetracarboxylic, pyrenetricarboxylic, and pyrenetetracarboxylic acids.

Examples of the poly hydric alcohol compound is a compound having two or more hydroxy groups in one molecule. Examples of the poly hydric alcohol include: dihydric alcohols such as ethylene glycol, propylene glycol, butanediol, diethylene glycol, hexanediol, cyclohexanediol, octanediol, decanediol, dodecanediol, ethylene oxide adducts of bisphenol A, and propylene oxide adducts of bisphenol A; and trivalent or higher-valent polyols such as glycerin, pentaerythritol, hexamethylol melamine, hexaethylol melamine, tetramethylol benzoguanamine, and tetraethylol benzoguanamine.

As a catalyst for synthesizing the crystalline polyester resin, various conventionally known catalysts can be used, and for example, an esterification catalyst can be used.

Examples of the esterification catalyst include tin compounds such as dibutyltin oxide and tin (II) 2-ethylhexanoate, and titanium compounds such as titanium diisopropylate bistricthanolaminate.

Examples of an esterification co-catalyst include gallic acid.

The amount of the esterification catalyst used is preferably 0.01 to 1.5 parts by mass and more preferably 0.1 to 1.0 parts by mass with respect to 100 parts by mass of the total amount of the polyhydric alcohol compound, the polyvalent carboxylic acid compound, and the bi-reactive monomer component.

The amount of the esterification co-catalyst used is preferably from 0.001 to 0.5 parts by mass and more preferably 0.01 to 0.1 parts by mass with respect to 100 parts by mass of the total amount of the poly hydric alcohol compound, the polyvalent carboxylic acid compound, and the bi-reactive monomer component.

Examples of a combination of a polyvalent carboxylic acid compound and a polyhydric alcohol compound that form a crystalline polyester resin usable in the present embodiment include 1,12-dodecanediol (having 12 carbon atoms) and sebacic acid (having 10) carbon atoms), ethylene glycol (having 2 carbon atoms) and sebacic acid (having 10) carbon atoms), 1,6-hexanediol (having 6 carbon atoms) and dodecanedioic acid (having 12 carbon atoms), 1,9-nonanediol (having) carbon atoms) and dodecanedioic acid (having 12 carbon atoms), and 1,6-hexanediol (having 6 carbon atoms) and sebacic acid (having 10 carbon atoms).

The melting point Tm of crystalline polyester resin particles is preferably in a range of 65 to 90° C., and more preferably in a range of 70 to 80° C. When the melting point Tm of the crystalline polyester resin particles is in the range of 65 to 90° C., the low-temperature fixability is not impaired and the heat-resistant storage stability is improved.

(Method for Measuring Melting Point of Crystalline Polyester Resin)

The melting point of the crystalline polyester resin can be measured by a differential scanning calorimeter (DSC).

For example, the melting point can be measured using DSC-7 differential scanning calorimeter (manufactured by PerkinElmer, Inc.) or TAC7/DX thermal analyzer controller (manufactured by PerkinElmer. Inc.). Specifically, 4.50 mg of a sample is enclosed in an aluminum pan (Kit No. 0219-0041). This is set in a sample holder of "DSC-7", and an empty aluminum pan is used for the reference measurement. The measurement is conducted under a heating-cooling-heating process in which the measurement temperature is within the range of 0) to 200° C., the heating rate is 10° C./min, and the cooling rate is 10° C./min. The data is obtained in the second heating step. The melting point is the temperature at the peak top of the endothermic peak.

Note that the method for measuring the melting point of the crystalline polyester resin can be similarly applied as a method for measuring the melting point of a crystalline resin other than the crystalline polyester resin.

<Hybrid Crystalline Polyester Resin>

The hybrid crystalline polyester resin is a resin formed by chemically bonding a crystalline polyester resin and an amorphous resin. In the following description, in the hybrid crystalline polyester resin, a portion derived from the crystalline polyester resin is referred to as a "first resin segment (segment of a first resin)", and a portion derived from the amorphous resin is referred to as a "second resin segment (segment of a second resin)".

The first resin segment and the second segment resin are preferably chemically bonded to each other via a bi-reactive monomer. Note that the first resin segment includes a crystalline polyester resin.

(First Resin Segment)

The first resin segment constituting the hybrid resin includes a crystalline polyester resin produced by polycondensation reaction of a polyvalent carboxylic acid and a polyhydric alcohol in the presence of a catalyst. Here, specific types of the polyvalent carboxylic acid and the polyhydric alcohol are as described above.

(Second Resin Segment)

The second resin segment constituting the hybrid crystalline resin includes a resin obtained by polymerizing a monomer for forming the second resin. Here, the monomer for forming the second resin is not particularly limited as long as it is a monomer for forming an amorphous resin. For example, a known monomer such as the above-described vinyl-based monomer for forming a vinyl-based resin can be used.

The content of the second resin segment with respect to the hybrid crystalline polyester resin (hybrid ratio) is preferably within a range of 0.1 to 30% by mass. A more preferable range of the content is within a range of 0.5 to 10% by mass. When the content is 0.1% by mass or more, an effect of promoting crystallization is more easily obtained. In addition, when the content is 30% by mass or less, increase of the compatibility is suppressed, and thus, similarly, the effect of promoting crystallization is more easily obtained.

The hybrid ratio is a ratio of the amount of the second resin to the total amount of the structures derived from the first resin, the second resin, and the bi-reactive monomers in the hybrid crystalline polyester resin.

The "bi-reactive monomer" is a monomer that bonds a first resin segment and a second resin segment. Further, the bi-reactive monomer is a monomer having both a group forming the first resin segment selected from a hydroxy group, a carboxy group, an epoxy group, a primary amino group, and a secondary amino group and an ethylenically unsaturated group forming the second resin segment in the molecule.

The bi-reactive monomer is preferably a monomer having a hydroxy group or a carboxy group and an ethylenically unsaturated group. More preferably, the bi-reactive monomer is a monomer having a carboxy group and an ethylenically unsaturated group. That is, the bi-reactive monomer is preferably a vinyl-based carboxylic acid.

Specific examples of the bi-reactive monomer include acrylic acid, methacrylic acid, fumaric acid, maleic acid, and the like, and furthermore, esters of hydroxyalkyl (having 1 to 3 carbon atoms) thereof may also be used. However, from the viewpoint of reactivity, acrylic acid, methacrylic acid, or fumaric acid is preferable as the bi-reactive monomer. The first resin segment and the second resin segment are bonded to each other via the bi-reactive monomer.

The amount of the bi-reactive monomer used is preferably 1 to 10 parts by mass, and more preferably 4 to 8 parts by mass, with respect to 100 parts by mass of the total amount of the monomers constituting the second resin segment. By setting the amount of the bi-reactive monomer used within the above range, the low-temperature fixability, high-temperature offset resistance and durability of the toner are improved.

(Method for Producing Hybrid Crystalline Resin)

As a method for producing the hybrid crystalline resin, an existing general scheme can be used. Representative methods include the following three.

(1) A method for forming a hybrid crystalline resin, including: first polymerizing a first resin segment; then reacting a bi-reactive monomer with the first resin segment; and reacting a monomer for forming a second resin segment (e.g., an aromatic vinyl monomer and a (meth)acrylate ester monomer) with the resulting product.

(2) A method for forming a hybrid crystalline resin, including: first polymerizing a second resin segment; then reacting a bi-reactive monomer with the second resin segment; and reacting a polyvalent carboxylic acid and a polyhydric alcohol for forming a first resin segment with the resulting product.

(3) A method for forming a hybrid crystalline resin, including: first polymerizing both a first resin segment and a second resin segment individually; and reacting a bi-reactive monomer with the first and second segments to bond the two.

In the present embodiment, any of the above-mentioned production methods can be used, but the method (2) is preferable.

Specifically: a polyvalent carboxylic acid and a polyhydric alcohol for forming a first resin segment, a monomer for forming a second resin segment, and a bi-reactive monomer are mixed. Then, a polymerization initiator is added to form the second resin segment by addition polymerization of the monomer for forming the second resin segment and the bi-reactive monomer. After that, an esterification catalyst is preferably added to cause a polycondensation reaction.

Here, as a catalyst for synthesizing the first resin segment, various conventionally known catalysts can be used. In addition, examples of the esterification catalyst include tin compounds such as dibutyltin oxide and tin (II) 2-ethylhexanoate, titanium compounds such as titanium diisopropylate bistriethanolaminate, and the like. Examples of the esterification co-catalyst include gallic acid (3,4,5-trihydroxybenzoic acid) and the like.

<Colorant>

A colorant can be added to the toner according to the present embodiment. As the colorant, known colorants as described below can be used.

Examples of the colorant contained in the yellow toner include: C.I. Solvent Yellows 19, 44, 77, 79, 81, 82, 93, 98, 103, 104, 112, and 162; and C.I. Pigment Yellows 14, 17, 74, 93, 94, 138, 155, 180 and 185. These may be used alone or in combination of two or more. Among them, in particular. C.I. Pigment Yellow 74 is preferable.

The content of the colorant contained in the yellow toner is preferably 1 to 10 parts by mass, and more preferably 2 to 8 parts by mass, with respect to 100 parts by mass of the binder resin.

Examples of the colorant contained in the magenta toner include: C.I. Solvent Reds 1, 49, 52, 58, 63, 111, and 122; and C. I. Pigment Reds 5, 48:1, 53:1, 57:1, 122, 139, 144, 149, 166, 177, 178 and 222. These may be used alone or in combination of two or more. Among them, in particular. C.I. Pigment Red 122 is preferable.

The content of the colorant contained in the magenta toner is preferably 1 to 10 parts by mass, and more preferably 2 to 8 parts by mass, with respect to 100 parts by mass of the binder resin.

Examples of the colorant contained in the cyan toner include C.I. Pigment Blue 15:3.

The content of the colorant contained in the cyan toner is preferably 1 to 10 parts by mass, and more preferably 2 to 8 parts by mass, with respect to 100 parts by mass of the binder resin.

Examples of the colorant contained in the black toner include carbon black, a magnetic material, and titanium black.

Examples of the carbon black include channel black, furnace black, acetylene black, thermal black, and lamp black.

Examples of the magnetic material include ferromagnetic metals such as iron, nickel, and cobalt, alloys containing any of these ferromagnetic metals, compounds of ferromagnetic metals such as ferrite and magnetite, and alloys containing no ferromagnetic metal but exhibiting ferromagnetism by heat treatment. Examples of the alloy that exhibits ferromagnetism by heat treatment include Heusler alloys such as manganese-copper-aluminum and manganese-copper-tin, and chromium dioxide.

The content of the colorant contained in the black toner is preferably 1 to 10 parts by mass, and more preferably 2 to 8 parts by mass, with respect to 100 parts by mass of the binder resin.

<Release Agent>

A release agent can be added to the toner base particles according to the present embodiment.

As the release agent, various known waxes can be used.

Examples of the wax include: polyolefin waxes such as polyethylene wax and polypropylene wax; branched-chain hydrocarbon waxes such as microcrystalline wax: long-chain hydrocarbon-based waxes such as paraffin wax and Sasol wax: dialkyl ketone waxes such as distearyl ketone: ester waxes such as carnauba wax, montan wax, behenyl behenate, trimethylolpropane tribehenate, pentaerythritol tetrabchenate, pentaerythritol diacetate dibchenate, glycerol tribehenate, 1,18-octadecanediol distearate, tristearyl trimellitate, and distearyl maleate; and amide-based waxes such as ethylenediamine behenylamide and trimellitic acid tristearylamide.

The content of the release agent is preferably 0.1 to 30 parts by mass, and more preferably 1 to 10 parts by mass, with respect to 100 parts by mass of the binder resin.

<Charge Control Agent>

A charge control agent can be added to the toner base particles according to the present embodiment as necessary.

The charge control agent is not particularly limited as long as the charge control agent is a substance capable of imparting positive or negative charge through triboelectric charging, and various known positive charge control agents and negative charge control agents can be used.

The content of the charge control agent is preferably 0.01 to 30 parts by mass, and more preferably 0.1 to 10 parts by mass, with respect to 100 parts by mass of the binder resin.

<External Additive>

The external additive serves to control the fluidity, chargeability, and the like of the toner particles.

It is preferable that the toner particles according to the present embodiment contain strontium titanate particles as the external additive from the viewpoint of effectively exhibiting a polishing force.

The number average particle size of the strontium titanate particles is preferably in a range of 10 to 60 nm.

A method for measuring the number average particle size is as follows.

After the external additive is externally added (dispersed) to the toner base particles, 100 primary particles of the external additive are observed with a scanning electron microscope "JSM-Model 7401F" (manufactured by JEOL Ltd) at a magnification of 40.000 times. The longest diameter and the shortest diameter of each particle are measured by image analysis of the primary particles, and an intermediate value is set as the spherical equivalent diameter. The average of the 100 measured primary particle sizes is defined as the number average primary particle size (number average particle size).

The toner particles may contain only one type of external additive or two or more types of external additives.

Examples of the external additive other than the strontium titanate particles include silica particles, titania particles, alumina particles, zirconia particles, zinc oxide particles, chromium oxide particles, and cerium oxide particles. Examples of the external additive include antimony oxide particles, tungsten oxide particles, tin oxide particles, tellurium oxide particles, manganese oxide particles, and boron oxide particles.

The surface of the external additive is preferably subjected to hydrophobic treatment. A known surface treating agent is used for the hydrophobic treatment. The surface treatment agent may be used alone, or two or more surface treatment agents may be used in combination. Examples of the surface treatment agent include a silane coupling agent, silicone oil, a titanate-based coupling agent, an aluminate-based coupling agent, a fatty acid, a fatty acid metal salt, an esterified product thereof, and a rosin acid.

Examples of the silane coupling agent include dimethyldimethoxysilane, hexamethyldisilazane (HMDS), methyltrimethoxysilane, isobutyltrimethoxysilane, decyltrimethoxysilane and the like.

Examples of the silicone oil include cyclic compounds and linear or branched organosiloxanes.

More specifically, examples of the silicone oil include organosiloxane oligomers, octamethylcyclotetrasiloxane, and decamethylcyclopentasiloxane. In addition, examples of the silicone oil include tetramethylcyclotetrasiloxane and tetravinyltetramethylcyclotetrasiloxane.

Examples of the silicone oil include a highly reactive silicone oil with at least the end modified by introducing a modifying group into a side chain, one end, both ends, one end of a side chain, both ends of a side chain, or the like. One or more types of the modifying group may be used. Examples of the modifying group include alkoxy, carboxyl, carbinol, higher fatty acid modification, phenol, epoxy. (meth)acryloyl, and amino.

The content of the external additive is preferably 0.1 to 10.0% by mass, more preferably 1.0 to 3.0% by mass, with respect to the total amount of the toner particles.

[Method for Producing Toner]

A method for producing the toner according to the present embodiment is not particularly limited, and known methods such as an emulsion aggregation method, a pulverization method, and a suspension polymerization method can be used.

The method for producing the toner according to the present embodiment is not particularly limited, and examples thereof include known methods such as a kneading and pulverizing method, a suspension polymerization method, an emulsion aggregation method, a dissolution suspension method, a polyester elongation method, and a dispersion polymerization method. Among them, the emulsion aggregation method is preferable from the viewpoint of uniformity of particle size and controllability of shape.

The toner according to the present embodiment can be specifically produced by a production method including the following procedure. However, this is merely an example, and the method for producing the toner according to the present embodiment is not limited to the following production method.

The emulsion aggregation method for producing the toner is a method in which a dispersion liquid of particles of a binder resin (hereinafter, also referred to as "binder resin particles") dispersed by a surfactant or a dispersion stabilizer is mixed, as necessary, with a dispersion liquid of particles of a colorant (hereinafter, also referred to as "colorant particles"), and agglomerated until a desired toner particle size is obtained, and further, fusion between the binder resin particles is performed to control the shape. Note that the binder resin particles may optionally contain a release agent, a charge control agent, and the like.

An example of a preferred method for producing the toner is shown below, where toner particles having a core-shell structure are obtained using the emulsion aggregation method:

(1) a step of preparing a colorant particle dispersion liquid in which colorant particles are dispersed in an aqueous medium;
(2) a step of preparing binder resin particle dispersion liquids (dispersion liquids of binder resin particles for core particles and a shell layer) in which binder resin particles containing an internal additive (such as a release agent and a charge control agent) as necessary are dispersed in an aqueous medium;
(3) a step of mixing the colorant particle dispersion liquid and the binder resin particle dispersion liquid for core particles to obtain a resin particle dispersion liquid for aggregation, and thereafter, aggregating and fusing the colorant particles and the binder resin particles for core particles in the presence of an aggregating agent to form aggregated particles as the core particles (aggregating and fusing step);
(4) a step of adding the dispersion liquid of binder resin particles for a shell layer containing binder resin particles for the shell layer to the dispersion liquid containing the core particles, and aggregating and fusing the binder resin particles for the shell layer on the surface of the core particles to form toner base particles having a core-shell structure (aggregating and fusing step);
(5) a step of cooling the toner base particles after the aggregating and fusing steps (cooling step);
(6) a step of separating (filtering) the toner base particles from the dispersion liquid of the toner base particles (toner base particle dispersion liquid) to remove a surfactant and the like (filtering and washing step);
(7) a step of drying the toner base particles (drying step);
(8) a step of mixing, as necessary, a plurality of types of toner base particles (classified products) having different variation coefficients of the shape factor and different variation coefficients of the volume average particle size to adjust the toner base particles to have a desired variation coefficient of the shape factor and a desired variation coefficient of the volume average particle size; and
(9) a step of adding the external additive to the toner base particles (adding the external additive step).

The toner particles having a core-shell structure are produced by: first aggregating and fusing the binder resin particles for core particles and the colorant particles to form the core particles: then adding the binder resin particles for a shell layer to the dispersion liquid of the core particles; and aggregating and fusing the binder resin particles for the shell layer on the surface of the core particles to form the shell layer covering the surface of the core particles. Note that, for example, by not adding the dispersion liquid of binder resin particles for a shell layer in the above step (+), the toner particles formed from single-layer particles can also be produced by the same method.

In the present embodiment, the "aqueous medium" refers to a medium composed of 50 to 100% by mass of water and 0 to 50% by mass of a water-soluble organic solvent. Examples of the water-soluble organic solvent include methanol, ethanol, isopropanol, butanol, acetone, methyl ethyl ketone, and tetrahydrofuran. Note that the solvent is preferably an alcohol-based organic solvent that does not dissolve the obtained resin.

(1) The step of preparing a colorant particle dispersion liquid in which colorant particles are dispersed in an aqueous medium The colorant particle dispersion liquid can be prepared by dispersing a colorant in an aqueous medium. The dispersion treatment of the colorant is preferably performed in an aqueous medium with the surfactant concentration equal to or higher than the critical micelle concentration (CMC) from the viewpoint of uniformly dispersing the colorant. Examples of a disperser used in the dispersion treatment of the colorant include various known dispersers.

(Surfactant)

Examples of the surfactant include: anionic surfactants such as alkylsulfuric acid ester salts, polyoxyethylene (n) alkyl ether sulfates, alkylbenzenesulfonates, α-olefinsulfonates, and phosphoric acid esters; amine salts such as alkylamine salts, aminoalcohol fatty acid derivatives, polyamine fatty acid derivatives, and imidazolines: quaternary ammonium salt-type cationic surfactants such as alkyltrimethylammonium salts, dialkyldimethylammonium salts, alkyldimethylbenzylammonium salts, pyridinium salts, alkylisoquinolinium salts, and benzethonium chloride: nonionic surfactants such as fatty acid amide derivatives and poly hydric alcohol derivatives; and amphoteric surfactants such as alanine, dodecyldi (aminoethyl) glycine, di(octylaminoethyl) glycine, and N-alkyl-N,N-dimethylammonium betaine. In addition, an anionic surfactant or a cationic surfactant having a fluoroalkyl group can also be used.

In this step, the dispersion diameter of the colorant particles in the prepared colorant particle dispersion liquid is preferably in a range of 10 to 300 nm in terms of volume-based median size. Note that the volume-based median size of the colorant particles in the colorant particle dispersion liquid can be measured with Microtrac UPA-150 (manufactured by Nikkiso Co., Ltd).

The colorant may be introduced into the toner base particles by dissolving or dispersing the colorant in a monomer solution for forming a resin in advance using a mini-emulsion method in the step of preparing binder resin particle dispersion liquids described below.

(2) The step of preparing binder resin particle dispersion liquids (dispersion liquids of binder resin particles for core particles and a shell layer) in which binder resin particles containing an internal additive (such as a release agent and a charge control agent) as necessary are dispersed in an aqueous medium Examples of a method for dispersing a binder resin in an aqueous medium include an aqueous direct dispersion method in which the binder resin is dispersed in the aqueous medium to which the surfactant has been added by an ultrasonic dispersion method, a bead mill dispersion method, or the like.

Examples of the dispersion method include a dissolution-emulsification-desolvation method in which a binder resin is dissolved in a solvent and the resulting product is dispersed in an aqueous medium to form emulsified particles (oil droplets), and then the solvent is removed, and a phase transfer emulsification method.

In this step, the mean particle size of the obtained binder particles is, for example, preferably within a range of 50 to 500 nm in terms of volume-based median size. Note that the volume-based median size was measured using "Coulter Multisizer 3" (manufactured by Beckman Coulter, Inc.).

In this step, emulsification (formation of droplets) by applying mechanical energy is essential. Examples of a means for applying mechanical energy include a means for applying strong stirring or ultrasonic vibration energy, such as homomixer, ultrasonic wave, and Manton-Gaulin.

In this step, the binder resin particles may include two or more layers of resins having different compositions.

In this case, it is possible to use a method in which a polymerization initiator and a polymerizable monomer are added to a dispersion liquid of resin particles prepared by an emulsion polymerization treatment (first stage polymerization) according to a conventional method, and this system is further subjected to polymerization treatment (second stage polymerization, third stage polymerization).

When a surfactant is used, the same surfactant as described above can be used.

(Polymerization Initiator)

The polymerization initiator is not particularly limited, and a known polymerization initiator can be used. Examples of the polymerization initiator include: peroxides such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl peroxymethoxyacetate, tert-butyl per-N-(3-toluyl) palmitate; and azo compounds such as 2,2'-azobis (2-amidinopropane) hydrochloride, 2,2'-azobis-(2-amidinopropane) nitrate, 1,1'-azobis (sodium 1-methylbutyronitrile-3-sulfonate), 4,4'-azobis-4-cyanovaleric acid, and poly (tetraethyleneglycol-2,2'-azobisisobutyrate).

Among them, as a water-soluble polymerization initiator, for example, ammonium persulfate, sodium persulfate, potassium persulfate, hydrogen peroxide, 2,2'-azobis (2-amidinopropane) hydrochloride, and 2,2'-azobis-(2-amidinopropane) nitrate are preferable. Furthermore, the water-soluble polymerization initiator is preferably 1,1'-azobis (sodium 1-methylbutyronitrile-3-sulfonate) or 4,4'-azobis-4-cyanovaleric acid.

As the polymerization initiator, a redox polymerization initiator such as a combination of persulfate and metabisulfite or a combination of hydrogen peroxide and ascorbic acid may also be used.

Furthermore, as the polymerization initiator, di-tert-butyl peroxide can also be used.

(Chain Transfer Agent)

In this step, particularly when an amorphous vinyl resin is used as the binder resin, a generally used chain transfer agent can be used for the purpose of adjusting the molecular weight of the resin. The chain transfer agent is not particularly limited, and examples thereof include alkyl mercaptan and mercapto fatty acid ester.

(3) The step of mixing the colorant particle dispersion liquid and the binder resin particle dispersion liquid for core particles to obtain a resin particle dispersion liquid for aggregation, and aggregating and fusing the colorant particles and the binder resin particles in the presence of an aggregating agent to form aggregated particles as core particles (aggregation and fusion step)

This step is a step of aggregating and fusing the colorant particles and the binder resin particles contained in the dispersion liquids formed in the above step in an aqueous medium. In this step, the binder resin particle dispersion liquid and the colorant particle dispersion liquid are added to the aqueous medium to which the surfactant has been added, and these particles are aggregated and fused.

As the surfactant to be used, the same surfactant as described above can be used. In addition, the amount of the surfactant to be added is preferably in a range of 1.0 to 5.0 parts by mass with respect to 100 parts by mass of the resin (solid content).

A specific method for aggregating and fusing the colorant particle dispersion liquid and the binder resin particle dispersion liquid is, for example as follows. An aggregating agent is added to an aqueous medium so that the concentration of the aggregating agent becomes equal to or higher than the critical aggregation concentration. Next, the mixture is heated to a temperature equal to or higher than the glass transition temperature of the binder resin particles and equal to or higher than the melting peak temperature of the release agent. This promotes salting-out of the colorant particles and the binder resin particles and, at the same time, promotes fusion in parallel. When the particles have grown to a desired particle size, an aggregation stopper is added to stop the particle growth. Further, the resulting product is heated continuously to control the particle shape as necessary.

In this method, it is preferable to heat the mixture to a temperature equal to or higher than the glass transition temperature of the binder resin as quickly as possible by minimizing the standing time after the addition of the aggregating agent. The reason for this is not clear, but there is a concern that the aggregation state of the particles changes depending on the standing time after salting-out, causing a problem that the particle size distribution becomes unstable or the surface properties of the fused particles change. The time required for this temperature increase is usually preferably within 30 minutes, more preferably within 10 minutes.

Furthermore, the heating rate is preferably 0.05 to 1° C./min.

Further, after the temperature of the reaction system reaches a temperature equal to or higher than the glass transition temperature, it is important to maintain the temperature of the reaction system for a certain period of time to continue the fusion. As a result, the growth and fusion of the toner base particles can be effectively promoted, and the durability of the finally obtained toner can be improved.

(Aggregating Agent)

The aggregating agent is not particularly limited but is preferably a metal salt. Examples of the metal salt include: monovalent metal salts such as salts of alkali metals like sodium, potassium, and lithium; divalent metal salts such as calcium, magnesium, manganese, and copper; and trivalent metal salts such as iron and aluminum. Specific examples of the metal salt include sodium chloride, potassium chloride, lithium chloride, calcium chloride, magnesium chloride, zinc chloride, copper sulfate, magnesium sulfate, manganese sulfate, and aluminum sulfate. Among them, it is more preferable to use a divalent metal salt because aggregation can be promoted with a small amount and the aggregation properties can be easily controlled.

They may be used alone or in combination of two or more.

(4) The step of adding the dispersion liquid of binder resin particles for a shell layer containing binder resin particles for the shell layer to the dispersion liquid containing the core particles, and aggregating and fusing the particles for the shell layer on the surface of the core particles to form toner base particles having a core-shell structure (aggregating and fusing step)

In this step, similarly to aggregating and fusing the colorant particles and the binder resin particles in the presence of an aggregating agent to form aggregated particles as core particles (aggregation and fusion step) in the step (3), the particles for the shell layer are aggregated and fused on the surface of the core particles to form the toner base particles having a core-shell structure.

(5) The step of cooling the toner base particles after the aggregating and fusing steps (cooling step)

In this step, when the shape factor of the obtained toner base particles reaches a range of 0.940 to 0.973, the toner base particles are cooled at a rate of 5 to 15° C./min.

(6) The step of filtering the toner base particles from the dispersion liquid of the toner base particles (toner base particle dispersion liquid) to remove a surfactant and the like (filtering and washing step)

(7) The step of drying the toner base particles (drying step):

Known methods can be used for the filtering and washing step and the drying step.

(8) The step of mixing, as necessary, a plurality of types of toner base particles (classified products) having different variation coefficients of the shape factor and different variation coefficients of the volume average particle size to adjust the toner base particles to have a desired variation coefficient of the shape factor and a desired variation coefficient of the volume average particle size Specifically, a plurality of types of toner base particles having different standard deviations of the volume average particle size and the shape factor are prepared in advance. Then, by combining and mixing the plurality of types of toner base particles, the variation coefficient of the shape factor and the variation coefficient of the volume average particle size are adjusted to meet the conditions defined in the present embodiment (9) The step of adding the external additive to the toner base particles (adding the external additive step)

This step is a step of adding and mixing the external additive to the toner base particles obtained above.

The external additive used is preferably strontium titanate particles, as described above. The number average particle size of the strontium titanate particles is preferably in a range of 10 to 60 nm.

Examples of the method for adding the external additive include a dry method in which a powdery external additive is added to and mixed with the dried toner base particles.

As a mixing device, a mechanical mixing device such as a Henschel mixer, a Nauta mixer, a Turbula mixer, or a coffee mill can be used.

Among them, it is preferable to use a mixing device, such as a Henschel mixer, that can apply a shearing force to the particles processed, to increase the mixing time or the rotational peripheral speed of the stirring blade.

As a result, the external additive can be firmly attached to each of the toner base particles.

In addition, when a plurality of types of external additives is used, the toner base particles may be mixed with all the external additives at once, or the toner base particles may be divided and mixed a plurality of times according to the external additives.

[Developer]

The toner according to the present embodiment can be suitably used as the following developer.

Examples thereof include a case where the toner is used as a one-component magnetic toner by incorporating a magnetic material, a case where the toner is used as a two-component developer by mixing with a so-called carrier, and a case where a non-magnetic toner is used alone. The toner according to the present embodiment can be suitably used in any of the aforementioned cases.

As the magnetic material, for example, magnetite, γ-hematite, or various ferrites can be used.

As the carrier constituting the two-component developer, magnetic particles made of a conventionally known material such as a metal like iron, steel, nickel, cobalt, ferrite, or magnetite, or an alloy of the metal and a metal such as aluminum or lead can be used.

As the carrier, it is preferable to use a coated carrier in which the surface of the magnetic particles is coated with a coating agent such as a resin, or a so-called resin-dispersed carrier in which a magnetic powder is dispersed in a binder resin.

The resin for coating is not particularly limited, and for example, an olefin resin, a styrene resin, a styrene-acrylic resin, a silicone resin, a polyester resin, or a fluorine resin is used.

In addition, the resin for forming the resin-dispersed carrier is not particularly limited, and a known resin can be used. As such a resin, for example, an acrylic resin, a styrene-acrylic resin, a polyester resin, a fluorine resin, a phenol resin, or the like can be used.

The volume-based median diameter of the carrier is preferably within a range of 20 to 100 μm, and more preferably within a range of 25 to 60 μm.

The volume-based median size of the carrier can be typically measured by a laser diffraction particle size distribution measuring apparatus equipped with a wet disperser. Examples of the laser diffraction particle size distribution measuring apparatus include "HELOS" (manufactured by SYMPATEC GmbH).

The amount of the toner mixed with the carrier is preferably in a range of 2 to 10% by mass with respect to 100% by mass of the total mass of the toner and the carrier.

Examples

Hereinafter, the present invention will be specifically described with reference to Examples, but the present invention is not limited thereto. Note that in the following Examples, operations were performed at room temperature (25° C.) unless otherwise specified. Further, unless otherwise specified. "%" and "part(s)" mean "% by mass" and "part(s) by mass", respectively.

[Production of Heating Roller 1]

(1) Preparation of Aluminum Alloy Base Body

A cylindrical base body (outer diameter: 040 mm, length: 360 mm) made of an aluminum alloy having the silicon content of 0.61% by mass was prepared.

(2) Formation of Resin-Coated Layer

A silicone resin was applied to a surface of the base body in an amount of 0.05 g/m$^2$ and dried to obtain a heating roller 1. Here, the silicone resin is a mixture of addition reaction type silicone (product name: SD7333, manufactured by Dow Corning Toray) and a catalyst (product name: SRX212, manufactured by Dow Corning Toray). The resin-coated layer had a thickness of 500 μm.

[Production of Heating Rollers 2 to 12, 14, and 16]

Heating rollers 2 to 12, 14, and 16 were produced in the same manner as the heating roller 1 except that the silicon content of the aluminum alloy base body was changed as shown in the following Table I.

[Production of Heating Roller 13]

(1) Preparation of Aluminum Alloy Base Body

A cylindrical base body (outer diameter: φ40 mm, length: 360 mm) made of an aluminum alloy having the silicon content of 2.90% by mass was prepared.

(2) Formation of Rubber Elastic Layer (Rubber Layer)

A cylindrical mold was placed over the outer side of the aluminum alloy base body. The base body and the cylindrical mold were coaxially held to form a cavity therebetween. Next, a silicone rubber material was injected into the cavity and cured by heating to form a rubber elastic layer of silicone rubber having a thickness of 200 μm.

[Production of Heating Roller 15]

A cylindrical base body (outer diameter: φ40 mm, length: 360 mm) made of an aluminum alloy having the silicon content of 2.90% by mass was prepared. This is defined as a heating roller 15.

[Production of Heating Roller 18]

(1) Preparation of Aluminum Alloy Base Body

A cylindrical base body (outer diameter: φ40 mm, length: 360 mm) made of an aluminum alloy having the silicon content of 2.90% by mass was prepared.

(2) Formation of Resin-coated Layer

After a fluorine resin (uncured) manufactured by Chemours was coated on the surface of the base body by a known coating means, the outer peripheral surface of the base body was covered with the inner peripheral surface of a PFA tube manufactured by Chemours-Mitsui Fluoroproducts Co., Ltd.

Then, the PFA tube was thermally shrunk by heating to produce a heating roller 18 having a PFA tube layer on its surface. The thickness of the PFA tube layer was 500 μm.

[Production of Heating Roller 19]

(1) Preparation of Aluminum Alloy Base Body

A cylindrical base body (outer diameter: 40 mm, length: 360 mm) made of an aluminum alloy having the silicon content of 2.90% by mass was prepared.

(2) Formation of Rubber Elastic Layer

A cylindrical mold holding a 30 μm thick PFA tube with an etched inner surface on the inner peripheral surface was placed over the outer side of the aluminum alloy base body. The base body and the cylindrical mold were coaxially held to form a gap therebetween. Next, a silicone rubber material as an elastic layer forming material was injected into the gap and cured by heating to form a rubber elastic layer of silicone rubber having a thickness of 200 μm.

In this way, a heating roller 19 having the silicone rubber elastic layer and the PFA tube layer in this order on the aluminum alloy base body was produced.

Note that a halogen heater is disposed inside the base bodies of the heating rollers 1 to 19. In addition, the heating temperature of the halogen heater in the image formation described later was set to be 160° C.

TABLE 1

TABLE I

| HEATING ROLLER No. | Si CONTENT OF BASE BODY [% BY MASS] | SURFACE OF BASE BODY |
|---|---|---|
| HEATING ROLLER 1 | 0.61 | SILICONE RESIN-COATED LAYER |
| HEATING ROLLER 2 | 0.79 | SILICONE RESIN-COATED LAYER |
| HEATING ROLLER 3 | 0.82 | SILICONE RESIN-COATED LAYER |
| HEATING ROLLER 4 | 1.48 | SILICONE RESIN-COATED LAYER |
| HEATING ROLLER 5 | 1.51 | SILICONE RESIN-COATED LAYER |
| HEATING ROLLER 6 | 1.78 | SILICONE RESIN-COATED LAYER |
| HEATING ROLLER 7 | 1.81 | SILICONE RESIN-COATED LAYER |
| HEATING ROLLER 8 | 3.10 | SILICONE RESIN-COATED LAYER |
| HEATING ROLLER 9 | 9.80 | SILICONE RESIN-COATED LAYER |
| HEATING ROLLER 10 | 10.20 | SILICONE RESIN-COATED LAYER |
| HEATING ROLLER 11 | 12.50 | SILICONE RESIN-COATED LAYER |
| HEATING ROLLER 12 | 12.80 | SILICONE RESIN-COATED LAYER |
| HEATING ROLLER 13 | 2.90 | SILICONE RUBBER ELASTIC LAYER |
| HEATING ROLLER 14 | 2.90 | SILICONE RESIN-COATED LAYER |
| HEATING ROLLER 15 | 2.90 | NONE |
| HEATING ROLLER 16 | 0.59 | SILICONE RESIN-COATED LAYER |
| HEATING ROLLER 17 | 2.90 | FLUORINE RESIN-COATED LAYER |
| HEATING ROLLER 18 | 2.90 | PFA TUBE LAYER |
| HEATING ROLLER 19 | 2.90 | RUBBER ELASTIC LAYER + PFA TUBE LAYER |

[Production of Heating Roller 17]

A heating roller 17 was produced in the same manner as the heating roller 14 except that fluorinated acrylic-based Novec 2702 (solvent: Novec 7200) manufactured by 3M Co., Ltd, was used in place of the silicone resin. The fluorine resin-coated layer had a thickness of 500 μm.

[Configurations 1 to 6 of Fixing Device]

For Configurations 1 to 6 of the fixing device, the position of the heating roller, the presence or absence of preheating, and the presence or absence of the fixing pad were as shown in the following Table II.

The position of the heating roller is "inside belt" when the heating roller 31 is inside the belt as illustrated in FIG. 1.

The position of the heating roller is "outside belt" when the second heating roller 31*a* is outside the belt as illustrated in FIG. 3.

In addition, "yes to preheating" is a case where the non-contact heating section 160 is disposed upstream of the fixing device 30 in the conveyance direction as illustrated in FIG. 6. In this case, the heating temperature of the non-contact heater 161 was set to 80 to 150° C. Furthermore, "yes to fixing pad" is a case where the fixing pad 4 is disposed as illustrated in FIG. 4A. The fixing pad used was made of a liquid crystal polymer resin coated with a fluorine resin on its surface.

In addition, the pressure roller and the belt, which are other components of the fixing device, were the same in all of Configurations 1 to 6. Specifically, as the pressure roller, a pressure roller obtained by covering a surface of a cylindrical tube containing stainless steel as a main component with a PFA tube was used. As the belt, a belt in which a silicone resin and a PFA resin were sequentially laminated on a surface of a polyimide base material was used.

TABLE 2

TABLE II

| FIXING DEVICE CONFIGURATION No. | POSITION OF HEATING ROLLER | PREHEATING | FIXING PAD |
|---|---|---|---|
| CONFIGURATION 1 | INSIDE BELT | NO | YES |
| CONFIGURATION 2 | INSIDE BELT | NO | NO |
| CONFIGURATION 3 | INSIDE BELT | YES | YES |
| CONFIGURATION 4 | OUTSIDE BELT | NO | YES |
| CONFIGURATION 5 | OUTSIDE BELT | YES | YES |
| CONFIGURATION 6 | INSIDE BELT + OUTSIDE BELT | NO | YES |

[Preparation of Fixing Device 1]

In Configuration 1, the fixing device 1 was prepared by using the heating roller 14 produced as described above.

[Preparation of Fixing Devices 2 and 17 to 20]

Fixing devices 2 and 17 to 20 were prepared in the same manner as in the preparation of the fixing device 1 except that the configuration of the fixing device was changed as shown in Table III below.

[Preparation of Fixing Devices 3 to 16 and 21 to 24]

Fixing devices 3 to 16 and 21 to 24 were prepared in the same manner as the fixing device 1 except that the heating roller used was changed as shown in Table III below.

TABLE 3

TABLE III

| FIXING DEVICE No. | HEATING ROLLER No. | FIXING DEVICE CONFIGURATION No. |
|---|---|---|
| FIXING DEVICE 1 | HEATING ROLLER 14 | CONFIGURATION 1 |
| FIXING DEVICE 2 | HEATING ROLLER 14 | CONFIGURATION 2 |
| FIXING DEVICE 3 | HEATING ROLLER 1 | CONFIGURATION 1 |
| FIXING DEVICE 4 | HEATING ROLLER 2 | CONFIGURATION 1 |
| FIXING DEVICE 5 | HEATING ROLLER 3 | CONFIGURATION 1 |
| FIXING DEVICE 6 | HEATING ROLLER 4 | CONFIGURATION 1 |
| FIXING DEVICE 7 | HEATING ROLLER 5 | CONFIGURATION 1 |
| FIXING DEVICE 8 | HEATING ROLLER 6 | CONFIGURATION 1 |
| FIXING DEVICE 9 | HEATING ROLLER 7 | CONFIGURATION 1 |
| FIXING DEVICE 10 | HEATING ROLLER 8 | CONFIGURATION 1 |
| FIXING DEVICE 11 | HEATING ROLLER 9 | CONFIGURATION 1 |
| FIXING DEVICE 12 | HEATING ROLLER 10 | CONFIGURATION 1 |
| FIXING DEVICE 13 | HEATING ROLLER 11 | CONFIGURATION 1 |
| FIXING DEVICE 14 | HEATING ROLLER 12 | CONFIGURATION 1 |

TABLE 3-continued

TABLE III

| FIXING DEVICE No. | HEATING ROLLER No. | FIXING DEVICE CONFIGURATION No. |
|---|---|---|
| FIXING DEVICE 15 | HEATING ROLLER 13 | CONFIGURATION 1 |
| FIXING DEVICE 16 | HEATING ROLLER 15 | CONFIGURATION 1 |
| FIXING DEVICE 17 | HEATING ROLLER 14 | CONFIGURATION 3 |
| FIXING DEVICE 18 | HEATING ROLLER 14 | CONFIGURATION 4 |
| FIXING DEVICE 19 | HEATING ROLLER 14 | CONFIGURATION 5 |
| FIXING DEVICE 20 | HEATING ROLLER 14 | CONFIGURATION 6 |
| FIXING DEVICE 21 | HEATING ROLLER 17 | CONFIGURATION 1 |
| FIXING DEVICE 22 | HEATING ROLLER 19 | CONFIGURATION 1 |
| FIXING DEVICE 23 | HEATING ROLLER 18 | CONFIGURATION 1 |
| FIXING DEVICE 24 | HEATING ROLLER 16 | CONFIGURATION 1 |

[Production of Toner]

<Preparation of Amorphous Polyester Resin Particle Dispersion Liquid 1>

<<Production of Amorphous Polyester Resin 1>>

Bisphenol A ethylene oxide 2.2 molar adduct: 42 parts by mole

Bisphenol A propylene oxide 2.2 molar adduct: 58 parts by mole

Dimethyl terephthalate: 59 parts by mole

Dimethyl fumarate: 15 parts by mole

Dodecenyl succinic anhydride: 21 parts by mole

Trimellitic anhydride: 5 parts by mole

A reaction vessel equipped with a stirrer, a thermometer, a condenser, and a nitrogen gas inlet tube was prepared. In the reaction vessel, the monomers other than the dimethyl fumarate and trimellitic anhydride among the above-described monomers and tin dioctylate were added in an amount of 0.25 parts by mass with respect to 100 parts by mass of the total of the above-described monomers.

The reaction was carried out under a nitrogen gas airflow at 235° C., for six hours, and then the temperature was lowered to 200° C., and the dimethyl fumarate and trimellitic anhydride were added thereto, followed by reaction for one hour. The temperature was raised to 220° C., over five hours, and polymerization was carried out under a pressure of 10 kPa until a desired molecular weight was obtained to produce a pale yellow transparent amorphous polyester resin 1.

The amorphous polyester resin 1 had a weight average molecular weight of 34500, a number average molecular weight of 7800, and a glass transition temperature (Tg) of 55.5° C.

<<Preparation of Amorphous Polyester Resin Particles Dispersion Liquid 1>>

Next, 200 parts by mass of the amorphous polyester resin 1, 95 parts by mass of methyl ethyl ketone, 40 parts by mass of isopropyl alcohol, and 7.5 parts by mass of a 10% by mass aqueous ammonia solution were put into a separable flask, and sufficiently mixed and dissolved.

Thereafter, while heating and stirring at 40° C., ion-exchanged water was added dropwise at a liquid feeding rate of 8.3 g/min using a liquid feeding pump, and the dropping was stopped when the liquid feeding amount reached 580 parts by mass.

Thereafter, the solvent was removed under reduced pressure to obtain an amorphous polyester resin particle dispersion liquid.

Ion-exchanged water was added to the dispersion liquid to adjust the solid content to 25% by mass to prepare an amorphous polyester resin particle dispersion liquid 1. The volume-based median size (d50) of the dispersion liquid was measured with Microtrac UPA-150 (manufactured by Nikkiso Co., Ltd.) and found to be 148 nm.

<Preparation of Crystalline Resin Particle Dispersion Liquid 1>

<<Production of Crystalline Resin 1>>

Dodecanedioic acid: 41 parts by mole 1,6-Hexanediol: 59 parts by mole

A reaction vessel equipped with a stirrer, a thermometer, a condenser, and a nitrogen gas inlet tube was prepared. The monomers were placed in the reaction vessel, and the air in the reaction vessel was replaced with dry nitrogen gas.

Next, titanium tetrabutoxide ($Ti(O\text{-}n\text{-}Bu)_4$) was added in an amount of 0.23 parts by mass with respect to 100 parts by mass of the total amount of the monomers. The reaction was carried out by stirring at 170° C., for three hours under a nitrogen gas airflow; and then the temperature was further raised to 210° C., over one hour. Thereafter, the pressure in the reaction vessel was reduced to 3 kPa, and the reaction mixture was stirred under the reduced pressure for 13 hours to obtain a crystalline resin 1. The crystalline resin 1 had a weight average molecular weight of 24500, a number average molecular weight of 8300, and a melting point of 71.7° C.

<<Preparation of Crystalline Resin Particles Dispersion Liquid 1>>

Next, 200 parts by mass of the crystalline resin 1, 115 parts by mass of methyl ethyl ketone, and 35 parts by mass of isopropyl alcohol were put into a separable flask, and sufficiently mixed and dissolved at 60° C. Thereafter, 8 parts by mass of a 10% by mass aqueous ammonia solution was added dropwise.

The heating temperature was lowered to 67° C., ion-exchanged water was added dropwise at a liquid feeding rate of 8.5 g/min using a liquid feeding pump while stirring, and the dropping of the ion-exchanged water was stopped when the liquid feeding amount reached 580 parts by mass. Thereafter, the solvent was removed under reduced pressure to obtain a crystalline resin particle dispersion liquid.

Ion-exchanged water was added to the dispersion liquid to adjust the solid content to 25% by mass to prepare a crystalline resin particle dispersion 1. The volume-based median size (d50) of the dispersion liquid was measured with Microtrac UPA-150 (manufactured by Nikkiso Co., Ltd.) and found to be 189 nm.

<Preparation of Crystalline Resin Particle Dispersion Liquid 2>

<<Production of Crystalline Resin 2>>

The following raw material monomers of an addition polymerization-based resin, bi-reactive monomer, and radical polymerization initiator were placed in a dropping funnel.

Styrene: 51 parts by mass

Butyl acrylate: 13 parts by mass

Acrylic acid: 6 parts by mass

Di-tert-butyl peroxide: 5.5 parts by mass

In addition, 560 parts by mass of stearyl methacrylate was placed in a four-necked flask equipped with a nitrogen inlet tube, a dehydration tube, a stirrer, and a thermocouple, and was heated to 170° C., to dissolve.

Next, the raw material monomers of the addition polymerization-based resin were added dropwise over 90 minute under stirring and aged for 60 minutes. Thereafter, the unreacted addition polymerization monomer was removed under reduced pressure (8 kPa) to obtain a crystalline resin 2. The obtained crystalline resin 2 had a weight average molecular weight (Mw) of 22, 000, a number average molecular weight of 7500, and a melting point of 76° C.

<<Preparation of Crystalline Resin Particles Dispersion Liquid 2>>

Next, 200 parts by mass of the crystalline resin 2, 115 parts by mass of methyl ethyl ketone, and 35 parts by mass of isopropyl alcohol were put into a separable flask, and sufficiently mixed and dissolved at 60° C. Thereafter, 8 parts by mass of a 10% by mass aqueous ammonia solution was added dropwise.

The heating temperature was lowered to 67° C., ion-exchanged water was added dropwise at a liquid feeding rate of 8 g/min using a liquid feeding pump while stirring, and the dropping of the ion-exchanged water was stopped when the liquid feeding amount reached 580 parts by mass.

Thereafter, the solvent was removed under reduced pressure to obtain a crystalline resin particle dispersion liquid. Ion-exchanged water was added to the dispersion liquid to adjust the solid content to 25% by mass to prepare a crystalline resin particle dispersion 2. The volume-based median size (d50) of the dispersion liquid was measured with Microtrac UPA-150 (manufactured by Nikkiso Co., Ltd.) and found to be 191 nm.

<Preparation of Release Agent Particle Dispersion Liquid 1>

Paraffinic wax (FNP0090, melting temperature 89° C., manufactured by Nippon Seiro Co., Ltd.): 268 parts by weight Anionic surfactant (NEOGEN RK manufactured by DKS Co., Ltd.): 15.5 parts by mass (active ingredient: 60%, 3% with respect to release agent)

Ion exchange water: 21.6 parts by mass

The materials described above were mixed, and the release agent was dissolved at an internal liquid temperature of 120° C., with a pressure discharge homogenizer (Gaulin homogenizer manufactured by Gaulin, Inc.). Thereafter, the mixture was dispersed at a dispersion pressure of 5 MPa for 120 minutes and subsequently at 40 MPa for 360 minutes, and cooled to obtain a dispersion liquid. Ion-exchanged water was added to adjust the solid content to 20%, and the resulting product was used as a release agent particle dispersion liquid 1. The volume average particle size of the particles in the lease agent particle dispersion liquid 1 was 205 nm.

<Preparation of Colorant Particle Dispersion Liquid>

<<Preparation of Black Colorant Particle Dispersion Liquid 1>>

Carbon black (REGAL® 330 manufactured by Cabot Corp.): 100 parts by mass

Anionic surfactant (NEOGEN SC manufactured by DKS Co., Ltd.): 16 parts by mass

Ion-exchange water: 400 parts by mass

The above components were mixed and pre-dispersed for 10 minutes by a homogenizer (ULTRA-TURRAX T50, manufactured by Ika-Werke Gmbh & Co. KG). Thereafter, the mixture was dispersed at a pressure of 245 MPa for 30 minutes using a high-pressure impact disperser (manufactured by Sugino Machine Limited) to obtain an aqueous dispersion liquid of black colorant particles. Ion-exchanged water was further added to the obtained dispersion liquid to adjust the solid content to 15% by mass, thereby preparing a black colorant particle dispersion liquid 1. The volume-based median size (d50) of the colorant particles in the dispersion liquid was measured using Microtrac UPA-150 (manufactured by Nikkiso Co., Ltd.) and found to be 95 nm.

<Production of Toner Base Particles 1>

<<Aggregating and Fusing Step and Aging Step>>

Amorphous polyester resin particle dispersion liquid 1:1008 parts by mass

Crystalline resin particle dispersion liquid 1:156 parts by mass

Release agent particle dispersion liquid 1:160 parts by mass

Black Colorant Particle Dispersion Liquid 1:187 parts by mass

Anionic surfactant (Dowfax 2A1, 20% aqueous solution): 40 parts by mass

Ion-exchange water: 1500 parts by mass

The above materials were placed in a 4-liter reaction vessel equipped with a thermometer, a pH meter, and a stirrer, and 1.0% nitric acid was added thereto at a temperature of 25° C., to adjust the pH to 3.0.

Thereafter, 100 parts by mass of an aluminum sulfate aqueous solution (aggregating agent) having a concentration of 2% was added over 30 minutes while dispersing at 3000 rpm using a homogenizer (ULTRA-TURRAX T50, manufactured by Ika-Werke Gmbh & Co. KG).

After completion of the dropwise addition, the mixture was stirred for 10 minutes to sufficiently mix the raw materials and the aggregating agent. Thereafter, a stirrer and a mantle heater were installed in the reaction vessel. While adjusting the rotation speed of the stirrer so that the slurry was sufficiently stirred, the temperature was raised at a rate of 0.2° C./min until the temperature reached 40° C., and at a rate of 0.05° C./min after the temperature exceeded 40° C. The particle size was measured every 10 minutes using Coulter Multisizer 3 (aperture diameter: 100 μm, manufactured by Beckman Coulter. Inc.). When the volume-based median size reached 5.7 μm, the temperature was maintained, and the following mixed solution which had been mixed in advance was added thereto over 20 minute.

Amorphous polyester resin particle dispersion liquid 1:400 parts by mass

Anionic surfactant (Dowfax 2A1, 20% aqueous solution): 15 parts by mass

Next, after the resulting product was held at 50° C., for 30 minutes, 9 parts by mass of a 20% solution of ethylenediaminetetraacetic acid (EDTA) was added to the reaction vessel, and a sodium hydroxide aqueous solution of 1 mol/L was added thereto to control the pH of the raw material dispersion liquid to 9.0. Thereafter, the temperature was increased to 85° C., at a temperature increase rate of 1° C./min while the pH was adjusted to 9.0 with each 5° C., increase, and then the temperature was maintained at 85° C.

<<Cooling Step>>

Thereafter, when the shape factor reached 0.963, the resulting product was cooled at a temperature decrease rate of 10° C./min using "FPIA-3000" to obtain a toner base particle dispersion liquid 1.

<<Filtering and Washing Step and Drying Step>>

The toner base particle dispersion liquid 1 was filtered and sufficiently washed with ion-exchanged water. Next, the resulting product was dried at 40° C., to obtain toner base particles 1. The obtained toner base particles 1 had a volume average particle size of 5.8 μm, a variation coefficient of the volume average particle size of 21.9%, a shape factor of 0.963, and a standard deviation of the shape factor of 0.030.

<Production of Toner Base Particles A>

Amorphous polyester resin particle dispersion liquid 1:1008 parts by mass

Crystalline resin particle dispersion liquid 1:156 parts by mass

Release agent particle dispersion liquid 1:160 parts by mass

Black Colorant Particle Dispersion Liquid 1:187 parts by mass

Anionic surfactant (Dowfax 2A1, 20% aqueous solution): 20 parts by mass

Ion-exchange water: 1500 parts by mass

The above materials were placed in a 4-liter reaction vessel equipped with a thermometer, a pH meter, and a stirrer, and 1.0% nitric acid was added at a temperature of 25° C., to adjust the pH to 2.5. Thereafter, 150 parts by mass of an aluminum sulfate aqueous solution (aggregating agent) having a concentration of 2% was added over 30 minutes while dispersing at 2300 rpm using a homogenizer (ULTRA-TURRAX T50, manufactured by Ika-Werke GmbH & Co. KG).

After completion of the dropwise addition, the mixture was stirred for 10 minutes to sufficiently mix the raw materials and the aggregating agent. Thereafter, a stirrer and a mantle heater were installed in the reaction vessel. While adjusting the rotation speed of the stirrer so that the slurry was sufficiently stirred, the temperature was raised at a rate of 0.2° C./min until the temperature reached 45° C., and at a rate of 0.05° C./min after the temperature exceeded 45° C. The particle size was measured every 10 minutes using Coulter Multisizer 3 (aperture diameter: 100 μm, manufactured by Beckman Coulter. Inc.). When the volume-based median size reached 5.7 μm, the temperature was maintained, and the following mixed solution which had been mixed in advance was added thereto over 20 minute.

Amorphous polyester resin particle dispersion liquid 1:400 parts by mass

Anionic surfactant (Dowfax 2A1, 20% aqueous solution): 15 parts by mass

Next, after the resulting product was held at 50° C., for 30 minutes, 9 parts by mass of a 20% solution of ethylenediaminetetraacetic acid (EDTA) was added to the reaction vessel. Thereafter, a sodium hydroxide aqueous solution of 1 mol/L was added to the resulting product to control the pH of the raw material dispersion liquid to 9.0. Furthermore, the temperature was increased to 85° C., at a temperature increase rate of 1° C./min while the pH was adjusted to 9.0 with each 5° C., increase, and then the temperature was maintained at 85° C.

<<Cooling Step>>

Thereafter, when the shape factor reached 0.963, the resulting product was cooled at a temperature decrease rate of 10° C./min using "FPIA-3000" to obtain a toner base particle dispersion liquid A.

<<Filtering and Washing Step and Drying Step>>

Thereafter, the toner base particle dispersion liquid A was filtered and sufficiently washed with ion-exchanged water. Next, the resulting product was dried at 40° C., to obtain toner base particles A. The obtained toner base particles A had a volume average particle size of 5.8 μm, a variation coefficient of volume average particle size of 33.0%, a shape factor of 0.963, and a standard deviation of the shape factor of 0.030.

<Production of Toner Base Particles 2 to 5, 15, and 19>

Toner base particles 2 to 5, 15, and 19 were produced by mixing the toner base particles 1 and the toner base particles A so as to have a desired variation coefficient (coefficient of variation. Cv) of the volume average particle size shown in Table IV below.

<Production of Toner Base Particle 10>

Toner base particles 10 were produced in the same manner as the toner base particles 5 except that the crystalline resin 1 was not added in the production of the toner base particles 1 and the toner base particles A.

<Production of Toner Base Particle 11>

Toner base particles 11 were produced in the same manner as the toner base particles 5 except that the crystalline resin 2 was used in place of the crystalline resin 1 in the production of the toner base particles 1 and the toner base particles A.

<Production of Toner Base Particles 12 to 14 and 18>

Toner base particles 12 to 14 and 18 were produced in the same manner as the toner base particle 5 except that the amount of the crystalline resin 1 added in the production of the toner base particles 1 and the toner base particles A was changed as shown in Table IV below.

<Production of Toner Base Particles 9>

<<Aggregating and Fusing Step and Aging Step>>

Amorphous polyester resin particle dispersion liquid 1:1008 parts by mass

Crystalline resin particle dispersion liquid 1:156 parts by mass

Release agent particle dispersion liquid 1:160 parts by mass

Black Colorant Particle Dispersion Liquid 1:187 parts by mass

Anionic surfactant (Dowfax 2A1, 20% aqueous solution): 40 parts by mass

Ion-exchange water: 1500 parts by mass

The above materials were placed in a 4-liter reaction vessel equipped with a thermometer, a pH meter, and a stirrer, and 1.0% nitric acid was added thereto at a temperature of 25° C., to adjust the pH to 3.0.

Thereafter, 100 parts by mass of an aluminum sulfate aqueous solution (aggregating agent) having a concentration of 2% was added over 30 minutes while dispersing at 2800 rpm using a homogenizer (ULTRA-TURRAX T50, manufactured by Ika-Werke Gmbh & Co. KG). After completion of the dropwise addition, the mixture was stirred for 10 minutes to sufficiently mix the raw materials and the aggregating agent.

Thereafter, a stirrer and a mantle heater were installed in the reaction vessel. While adjusting the rotation speed of the stirrer so that the slurry was sufficiently stirred, the temperature was raised at a rate of 0.2° C./min until the temperature reached 40° C., and at a rate of 0.05° C./min after the temperature exceeded 40° C. The particle size was measured every 10 minutes using Coulter Multisizer 3 (aperture diameter: 100 μm, manufactured by Beckman Coulter. Inc.). When the volume-based median size reached 5.7 μm, the temperature was maintained, and the following mixed solution which had been mixed in advance was added thereto over 20 minute.

Amorphous polyester resin particle dispersion liquid 1:400 parts by mass

Anionic surfactant (Dowfax 2A1, 20% aqueous solution): 40 parts by mass

Next, after the resulting product was held at 50° C., for 30 minutes, 9 parts by mass of a 20% solution of ethylenediaminetetraacetic acid (EDTA) was added to the reaction vessel. Thereafter, a sodium hydroxide aqueous solution of 1 mol/L was added to the resulting product to control the pH of the raw material dispersion liquid to 9.0. Next, the temperature was increased to 83° C., at a temperature increase rate of 1° C./min while the pH was adjusted to 9.0 with each 5° C., increase, and then the temperature was maintained at 83° C.

<<Cooling Step>>

Thereafter, when the shape factor reached 0.968, the resulting product was cooled at a temperature decrease rate of 10° C./min using "FPIA-3000" to obtain a toner base particle dispersion liquid 9.

<<Filtering and Washing Step and Drying Step>>

Thereafter, the toner base particle dispersion liquid 9 was filtered and sufficiently washed with ion-exchanged water. Next, the resulting product was dried at 40° C., to obtain toner base particles 9. The obtained toner base particles 9 had a volume average particle size of 5.7 μm, a variation coefficient of the volume average particle size of 26.0%, a shape factor of 0.968, and a standard deviation of the shape factor of 0.029.

<Production of Toner Base Particles B>

Toner base particles B were produced in the same manner as the toner base particles 9 except that the cooling was performed using "FPIA-3000" when the shape factor reached 0.940 in the <<cooling step>>. The produced toner base particles B had a volume average particle size of 5.7 μm, a variation coefficient of the volume average particle size of 26.0%, a shape factor of 0.940, and a standard deviation of the shape factor of 0.031.

<Production of Toner Base Particles C>

Toner base particles C were produced in the same manner as the toner base particles 9 except that the cooling was performed using "FPIA-3000" when the shape factor reached 0.973 in the <<cooling step>>. The produced toner base particles C had a volume average particle size of 5.7 μm, a variation coefficient of the volume average particle size of 26.0%, a shape factor of 0.973, and a standard deviation of the shape factor of 0.029.

<Production of Toner Base Particles 6 to 8, 16, 17, and 20>

Toner base particles 6 to 8, 16, 17, and 20 were produced by mixing the toner base particles 9, the toner base particles B, and the toner base particles C so as to have a desired standard deviation (SD) of the shape factor shown in Table IV below.

TABLE 4

TABLE IV

| TONER BASE PARTICLES No. | VOLUME Cv [%] | SHAPE SD [—] | CRYSTALLINE RESIN TYPE | CRYSTALLINE RESIN AMOUNT [% BY MASS] |
|---|---|---|---|---|
| TONER BASE PARTICLES 1 | 21.9 | 0.030 | CRYSTALLINE RESIN 1 | 10 |
| TONER BASE PARTICLES 2 | 24.8 | 0.030 | CRYSTALLINE RESIN 1 | 10 |
| TONER BASE PARTICLES 3 | 23.9 | 0.030 | CRYSTALLINE RESIN 1 | 10 |
| TONER BASE PARTICLES 4 | 22.6 | 0.030 | CRYSTALLINE RESIN 1 | 10 |
| TONER BASE PARTICLES 5 | 26.0 | 0.030 | CRYSTALLINE RESIN 1 | 10 |
| TONER BASE PARTICLES 6 | 26.0 | 0.045 | CRYSTALLINE RESIN 1 | 10 |
| TONER BASE PARTICLES 7 | 26.0 | 0.034 | CRYSTALLINE RESIN 1 | 10 |
| TONER BASE PARTICLES 8 | 26.0 | 0.031 | CRYSTALLINE RESIN 1 | 10 |

TABLE 4-continued

TABLE IV

| TONER BASE PARTICLES No. | VOLUME Cv [%] | SHAPE SD [—] | CRYSTALLINE RESIN TYPE | CRYSTALLINE RESIN AMOUNT [% BY MASS] |
|---|---|---|---|---|
| TONER BASE PARTICLES 9 | 26.0 | 0.029 | CRYSTALLINE RESIN 1 | 10 |
| TONER BASE PARTICLES 10 | 26.0 | 0.030 | NONE | — |
| TONER BASE PARTICLES 11 | 26.0 | 0.030 | CRYSTALLINE RESIN 2 | 10 |
| TONER BASE PARTICLES 12 | 26.0 | 0.030 | CRYSTALLINE RESIN 1 | 5.2 |
| TONER BASE PARTICLES 13 | 26.0 | 0.030 | CRYSTALLINE RESIN 1 | 4.7 |
| TONER BASE PARTICLES 14 | 26.0 | 0.030 | CRYSTALLINE RESIN 1 | 19 |
| TONER BASE PARTICLES 15 | 28.0 | 0.030 | CRYSTALLINE RESIN 1 | 10 |
| TONER BASE PARTICLES 16 | 26.0 | 0.036 | CRYSTALLINE RESIN 1 | 10 |
| TONER BASE PARTICLES 17 | 26.0 | 0.045 | CRYSTALLINE RESIN 1 | 10 |
| TONER BASE PARTICLES 18 | 26.0 | 0.030 | CRYSTALLINE RESIN 1 | 21 |
| TONER BASE PARTICLES 19 | 30.0 | 0.030 | CRYSTALLINE RESIN 1 | 10 |
| TONER BASE PARTICLES 20 | 26.0 | 0.048 | CRYSTALLINE RESIN 1 | 10 |

<Production of Toners 1 to 18, 20, and 21>

The following external additives were added to the toner base particles 1 to 20 produced above.

Hydrophobic silica (number average primary particle size: 12 nm, degree of hydrophobization: 68): 1.0% by mass Strontium titanate (number average primary particle size: 40 nm, degree of hydrophobization: 60): 0.8% by weight Spherical silica (average primary particle size: 80 nm, degree of hydrophobization: 59): 0.5% by mass Thereafter, the mixture was mixed using a Henschel mixer (manufactured by Mitsui Miike Chemical Engineering Machinery Co., Ltd.), and then coarse particles were removed using a sieve having an opening of 45 μm to produce toners 1 to 18, 20, and 21. The corresponding relationships between the toner base particles 1 to 20 and the toners 1 to 21 are as shown in Table V below.

<Production of Toner 19>

A toner 19 was produced in the same manner as the toner 1 except that strontium titanate was not added.

<Production of Carrier>

100 parts by mass of ferrite core and 5 parts by mass of copolymer resin particles of cyclohexyl methacrylate/methyl methacrylate (copolymerization ratio: 5/5) were added to a high-speed mixer equipped with a stirring blade. The mixture was stirred and mixed at 120° C., for 30 minutes to form a resin-coated layer on a surface of the ferrite core by the action of mechanical impact force, thereby obtaining a carrier having a volume-based median size of 35 μm.

The volume-based median size of the carrier was measured with a laser diffraction particle size distribution analyzer "HELOS" (manufactured by SYMPATEC GmbH) equipped with a wet disperser.

<Production of Developers 1 to 21>

Each of the toners 1 to 21 was added to the carrier so that the toner concentration was 6% by mass, and the mixture was put into a micro V-type mixer (Tsutsui Rikagaku Kikai Co., Ltd.). The mixture was mixed at a rotation speed of 45 rpm for 30 minutes to produce developers 1 to 21.

TABLE 5

TABLE V

| DEVELOPER No. | TONER No. | TONER BASE PARTICLES No. | STRONTIUM TITANATE |
|---|---|---|---|
| DEVELOPER 1 | TONER 1 | TONER BASE PARTICLES 5 | YES |
| DEVELOPER 2 | TONER 2 | TONER BASE PARTICLES 2 | YES |
| DEVELOPER 3 | TONER 3 | TONER BASE PARTICLES 3 | YES |
| DEVELOPER 4 | TONER 4 | TONER BASE PARTICLES 4 | YES |
| DEVELOPER 5 | TONER 5 | TONER BASE PARTICLES 1 | YES |
| DEVELOPER 6 | TONER 6 | TONER BASE PARTICLES 6 | YES |
| DEVELOPER 7 | TONER 7 | TONER BASE PARTICLES 7 | YES |
| DEVELOPER 8 | TONER 8 | TONER BASE PARTICLES 8 | YES |
| DEVELOPER 9 | TONER 9 | TONER BASE PARTICLES 9 | YES |
| DEVELOPER 10 | TONER 10 | TONER BASE PARTICLES 10 | YES |
| DEVELOPER 11 | TONER 11 | TONER BASE PARTICLES 11 | YES |
| DEVELOPER 12 | TONER 12 | TONER BASE PARTICLES 12 | YES |
| DEVELOPER 13 | TONER 13 | TONER BASE PARTICLES 13 | YES |
| DEVELOPER 14 | TONER 14 | TONER BASE PARTICLES 14 | YES |
| DEVELOPER 15 | TONER 15 | TONER BASE PARTICLES 15 | YES |
| DEVELOPER 16 | TONER 16 | TONER BASE PARTICLES 16 | YES |
| DEVELOPER 17 | TONER 17 | TONER BASE PARTICLES 17 | YES |
| DEVELOPER 18 | TONER 18 | TONER BASE PARTICLES 18 | YES |
| DEVELOPER 19 | TONER 19 | TONER BASE PARTICLES 5 | NO |
| DEVELOPER 20 | TONER 20 | TONER BASE PARTICLES 19 | YES |
| DEVELOPER 21 | TONER 21 | TONER BASE PARTICLES 20 | YES |

[Evaluation]

<Fixing Unevenness in Initial Image Quality>

A bizhub C250i equipped with a fixing device shown in Table VI below was used, and a developer shown in Table VI below was used. Then, a 30% halftone chart was output on A4-size high-quality paper in an environment at room temperature (temperature: 20° C., relative humidity: 50% RH).

The image density of this image was measured at five points in the axial direction of the photoreceptor and evaluated. The image density was measured using an image densitometer (Macbeth RD914). "A", "B", and "C" in the following evaluation criteria were regarded as having no practical problem.

(Criteria)

A: very good with a density variation of less than 10%

B: good with a density variation of 10% or more and less than 15%

C: density variation of 15% or more and less than 20%

D: density variation of 20% or more

<Contamination of Belt>

500.000 sheets of an image with a coverage rate of 5% were printed on A4-size high-quality paper in an environment at room temperature (temperature: 20° C., relative humidity: 50% RH) using the evaluation machine used in "<Fixation Unevenness in Initial Image Quality>".

Immediately after the printing of 500.000 sheets was completed, five solid white images were output, and the degree of contamination of the images was visually evaluated. The evaluation criteria are as follows. "A", "B", and "C" in the following evaluation criteria were regarded as having no practical problem.

(Criteria)

A: There are no stains in the five images.

B: The number of minor stains is less than 10 in the five images.

C: The number of minor stains is 10 or more and less than 50 in the five images.

D: The number of minor stains is 50 or more in the five images. Alternatively, obvious and distinct stains are seen in any of the five images.

<Fixing Unevenness in Image Quality after Endurance>

A 30% halftone chart was output on 500.000 sheets of A4-size high-quality paper in a low-temperature and low-humidity environment (LL environment) (temperature: 10° C., relative humidity: 10% RH) using the evaluation machine used in "<Fixation Unevenness in Initial Image Quality>". The image density of this image was measured at five points in the axial direction of the photoreceptor and evaluated. The image density was measured using an image densitometer (Macbeth RD914). The evaluation criteria are as follows. "A", "B", and "C" in the following evaluation criteria were regarded as having no practical problem.

(Criteria)

A: very good with a density variation of less than 10%

B: good with a density variation of 10% or more and less than 15%

C: density variation of 15% or more and less than 20%

D: density variation of 20% or more

<LL Fixing Strength in Image Quality after Endurance>

An image was developed on 500.000 sheets of A4-size high-quality paper with a toner adhesion amount of 5 g/m$^2$ in a low-temperature and low-humidity environment (LL environment) (temperature: 10° C., relative humidity: 10% RH) using the evaluation machine used in "<Fixation Unevenness in Initial Image Quality>". Thereafter, the transferred sheets were fixed while the temperature setting of the fixing heat roller was changed from 100 to 210° C., in increments of 5° C. Thereafter, the fixed solid images were folded using a folding machine, and air of 0.35 MPa was blown thereto. The conditions of the fold lines were evaluated in five ranks with reference to the limit samples, and the fixing temperature for rank three was defined as the lower limit fixing temperature. The evaluation criteria are as follows. "A", "B", and "C" in the following evaluation criteria were regarded as having no practical problem.

(Criteria)

A: no peeling at all at the fold line

B: peeling along a portion of the fold line

C: thin liner peeling along the fold line

D: thick peeling along the fold line

<Number of Slip-Generated Prints>

Among the above-described 500,000 prints in the evaluation method of "<Contamination of Belt>", the member of prints on which a slip sound was generated is defined as the number of slip-generated prints. The evaluation criteria are as follows. "A", "B", and "C" in the following evaluation criteria were regarded as having no practical problem.

(Criteria)

A: no slip sound generated

B: no slip sound generated up to 350,000 sheets

C: no slip sound generated up to 200,000 sheets

D: slip sound generated at 100,000 sheets or less

TABLE 6

TABLE VI

| | FIXING DEVICE No. | DEVELOPER No. | EVALUATION INITIAL IMAGE QUALITY (FIXING UNEVENNESS) | IMAGE QUALITY AFTER ENDURANCE (FIXING UNEVENNESS) | IMAGE QUALITY AFTER ENDURANCE (LL FIXING STRENGTH) | *1 | *2 |
|---|---|---|---|---|---|---|---|
| EXAMPLE 1 | FIXING DEVICE 1 | DEVELOPER 1 | A | A | A | A | A |
| EXAMPLE 2 | FIXING DEVICE 2 | DEVELOPER 1 | A | B | B | A | A |
| EXAMPLE 3 | FIXING DEVICE 3 | DEVELOPER 1 | A | C | C | C | C |
| EXAMPLE 4 | FIXING DEVICE 4 | DEVELOPER 1 | A | C | C | C | B |
| EXAMPLE 5 | FIXING DEVICE 5 | DEVELOPER 1 | A | C | B | C | B |
| EXAMPLE 6 | FIXING DEVICE 6 | DEVELOPER 1 | A | C | B | C | A |
| EXAMPLE 7 | FIXING DEVICE 7 | DEVELOPER 1 | A | C | B | C | A |
| EXAMPLE 8 | FIXING DEVICE 8 | DEVELOPER 1 | A | B | B | B | A |
| EXAMPLE 9 | FIXING DEVICE 9 | DEVELOPER 1 | A | A | A | B | A |
| EXAMPLE 10 | FIXING DEVICE 10 | DEVELOPER 1 | A | B | A | A | A |

TABLE 6-continued

TABLE VI

| | FIXING DEVICE No. | DEVELOPER No. | EVALUATION INITIAL IMAGE QUALITY (FIXING UNEVENNESS) | IMAGE QUALITY AFTER ENDURANCE (FIXING UNEVENNESS) | IMAGE QUALITY AFTER ENDURANCE (LL FIXING STRENGTH) | *1 | *2 |
|---|---|---|---|---|---|---|---|
| EXAMPLE 11 | FIXING DEVICE 11 | DEVELOPER 1 | A | B | B | A | A |
| EXAMPLE 12 | FIXING DEVICE 12 | DEVELOPER 1 | A | B | B | A | A |
| EXAMPLE 13 | FIXING DEVICE 13 | DEVELOPER 1 | A | B | C | A | A |
| EXAMPLE 14 | FIXING DEVICE 14 | DEVELOPER 1 | A | C | C | A | A |
| EXAMPLE 15 | FIXING DEVICE 15 | DEVELOPER 1 | A | A | A | A | A |
| EXAMPLE 16 | FIXING DEVICE 1 | DEVELOPER 2 | A | C | C | A | A |
| EXAMPLE 17 | FIXING DEVICE 1 | DEVELOPER 3 | A | C | B | A | A |
| EXAMPLE 18 | FIXING DEVICE 1 | DEVELOPER 4 | A | B | B | A | A |
| EXAMPLE 19 | FIXING DEVICE 1 | DEVELOPER 5 | A | B | A | A | A |
| EXAMPLE 20 | FIXING DEVICE 16 | DEVELOPER 1 | A | A | B | A | A |
| EXAMPLE 21 | FIXING DEVICE 1 | DEVELOPER 6 | A | C | C | A | A |
| EXAMPLE 22 | FIXING DEVICE 1 | DEVELOPER 7 | A | C | B | A | A |

*1: NUMBER OF SLIP-GENERATED PRINTS
*2: CONTAMINATION OF PARTS

TABLE 7

TABLE VII

| | FIXING DEVICE No. | DEVELOPER No. | EVALUATION INITIAL IMAGE QUALITY (FIXING UNEVENNESS) | IMAGE QUALITY AFTER ENDURANCE (FIXING UNEVENNESS) | IMAGE QUALITY AFTER ENDURANCE (LL FIXING STRENGTH) | *1 | *2 |
|---|---|---|---|---|---|---|---|
| EXAMPLE 23 | FIXING DEVICE 1 | DEVELOPER 8 | A | B | B | A | A |
| EXAMPLE 24 | FIXING DEVICE 1 | DEVELOPER 9 | A | B | A | A | A |
| EXAMPLE 25 | FIXING DEVICE 1 | DEVELOPER 10 | B | C | C | A | A |
| EXAMPLE 26 | FIXING DEVICE 1 | DEVELOPER 11 | B | C | C | A | B |
| EXAMPLE 27 | FIXING DEVICE 1 | DEVELOPER 12 | A | C | B | A | A |
| EXAMPLE 28 | FIXING DEVICE 1 | DEVELOPER 13 | B | C | C | A | B |
| EXAMPLE 29 | FIXING DEVICE 1 | DEVELOPER 14 | A | B | B | A | C |
| EXAMPLE 30 | FIXING DEVICE 1 | DEVELOPER 15 | A | C | C | A | A |
| EXAMPLE 31 | FIXING DEVICE 1 | DEVELOPER 16 | A | C | B | A | A |
| EXAMPLE 32 | FIXING DEVICE 17 | DEVELOPER 17 | A | C | B | A | A |
| EXAMPLE 33 | FIXING DEVICE 18 | DEVELOPER 1 | A | A | A | A | A |
| EXAMPLE 34 | FIXING DEVICE 19 | DEVELOPER 17 | A | C | B | A | A |
| EXAMPLE 35 | FIXING DEVICE 20 | DEVELOPER 1 | A | A | A | A | A |
| EXAMPLE 36 | FIXING DEVICE 1 | DEVELOPER 18 | A | A | A | A | C |
| EXAMPLE 37 | FIXING DEVICE 1 | DEVELOPER 19 | A | B | B | A | C |
| EXAMPLE 38 | FIXING DEVICE 21 | DEVELOPER 1 | A | A | A | A | A |
| EXAMPLE 39 | FIXING DEVICE 22 | DEVELOPER 1 | A | A | A | A | A |
| EXAMPLE 40 | FIXING DEVICE 23 | DEVELOPER 1 | A | A | A | A | A |
| COMPARATIVE EXAMPLE 1 | FIXING DEVICE 24 | DEVELOPER 1 | D | D | D | D | C |
| COMPARATIVE EXAMPLE 2 | FIXING DEVICE 1 | DEVELOPER 20 | A | D | D | A | A |
| COMPARATIVE EXAMPLE 3 | FIXING DEVICE 1 | DEVELOPER 21 | A | D | C | A | A |

*1: NUMBER OF SLIP-GENERATED PRINTS
*2: CONTAMINATION OF PARTS

As shown in the above results, the fixing unevenness in the initial image quality and the image quality after endurance can be suppressed in the present embodiment compared to the comparative examples. Further, it can be seen that the fixing strength of the image quality after endurance in the LL environment is also satisfactory, and the generation of a slip and the contamination of the belt can also be suppressed.

Although embodiments of the present invention have been described and shown in detail, the disclosed embodiments are made for purposes of illustration and example only and not limitation. The scope of the present invention should be interpreted by terms of the appended claims.

According to the present embodiment, it is possible to provide an image forming system that, during high-speed operation of a fixing device, can suppress deterioration of fixability and degradation of a roller and a belt of the fixing device due to slip of the roller of the fixing device and can obtain a satisfactory image even in a low-temperature environment.

Although the realization mechanism or action mechanism of the effect of the present invention is not clear, the inventors infer the mechanism as follows.

In the present invention, since at least one roller includes a base body containing aluminum as a main component, and the base body includes silicon in an amount exceeding 0.60% by mass, crystal portions (protruded portions) are formed on the surface of the base body due to the eutectic reaction between Al and Si. The deterioration of fixability due to slip of the roller is suppressed by an anchoring effect exerted by the protruded portions. Furthermore, the deterioration of the roller and the belt can be prevented even in long-term use.

In particular, even when a resin-coated layer or a rubber layer is disposed on the surface of the roller in order to suppress the slip of the roller, the existence of the crystal portions (protruded portions) on the surface of the base body due to the eutectic reaction between Al and Si can prevent the resin-coated layer or the rubber layer from peeling off during long-term use due to the anchoring effect.

Furthermore, to counteract the decrease in heat conductivity due to a large amount of silicon contained in the base body, it is effective to reduce the standard deviation of the shape factor of the toner base particles and to reduce the variation coefficient of the volume average particle size of the toner base particles.

When the standard deviation is set to be equal to or less than a certain value, the number of irregularly shaped particles is reduced and differences in contact area with the belt among the particles are reduced. Therefore, a variation in the melting speed of the toner base particles becomes small, thereby preventing the fixability from deteriorating in a low environment.

In addition, when the variation coefficient of the volume average particle size of the toner base particles is set to be equal to or less than a certain value, a variation in particle size is reduced. As a result, there is less mixing of the easily soluble toner base particles with the non-easily soluble toner base particles, thereby preventing the deterioration of fixability in a low-temperature environment.

What is claimed is:

1. An image forming system comprising a toner for forming a toner image and a fixing device configured to fix the toner image onto a recording medium, wherein the fixing device includes:

a belt; and one or more rollers including: a first roller that stretches the belt and, optionally, a second roller rotatably disposed in pressure contact with an outer peripheral surface of the belt, wherein at least one of the one or more rollers includes a base body containing aluminum as a main component, wherein the base body contains silicon in an amount exceeding 0.60% by mass, and wherein toner base particles of the toner have a standard deviation of a shape factor of 0.045 or less, and have a variation coefficient of a volume average particle size of 28.0% or less.

2. The image forming system according to claim 1, wherein the base body contains silicon in an amount exceeding 0.80% by mass.

3. The image forming system according to claim 1, wherein the fixing device further includes a pressure roller disposed outside the belt and a pad disposed inside the belt so as to face the pressure roller, and the belt is sandwiched by the pressure roller and the pad to form a nip.

4. The image forming system according to claim 1, wherein the fixing device further includes a heat source that is disposed inside at least one of the one or more rollers to heat the belt.

5. The image forming system according to claim 1, wherein a resin-coated layer or a rubber layer is disposed on a surface of at least one of the one or more rollers.

6. The image forming system according to claim 1, configured to heat the toner image in a non-contact manner by a heater before the toner image is fixed onto the recording medium.

7. The image forming system according to claim 1, the toner base particles contain a crystalline resin in a range of 5.0 to 20% by mass of a binder resin.

8. The image forming system according to claim 1, wherein strontium titanate particles having a number average particle size in a range of 10 to 60 nm are added as an external additive to the toner base particles.

* * * * *